United States Patent
Surkatty et al.

(10) Patent No.: US 10,540,270 B1
(45) Date of Patent: Jan. 21, 2020

(54) REPRESENTATION-BASED AUTOMATED SOFTWARE TESTING

(71) Applicant: Amazon Technologies, Inc., Seattle, WA (US)

(72) Inventors: Osman Surkatty, Seattle, WA (US); Josh Phelan Dukes, Seattle, WA (US); Khai Tran, Lynnwood, WA (US); Oleg Mitrofanov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/880,382

(22) Filed: Jan. 25, 2018

(51) Int. Cl.
*G06F 11/36* (2006.01)
*G06F 9/445* (2018.01)
*G06F 9/44* (2018.01)
*G06F 9/54* (2006.01)

(52) U.S. Cl.
CPC .......... *G06F 11/3688* (2013.01); *G06F 9/542* (2013.01); *G06F 9/547* (2013.01); *G06F 11/3684* (2013.01); *G06F 11/3604* (2013.01); *G06F 11/3636* (2013.01); *G06F 11/3664* (2013.01)

(58) Field of Classification Search
CPC .. G06F 11/3664; G06F 11/3636; G06F 8/443; G06F 9/541; G06F 9/54; G06F 11/3684; G06F 11/3604; G06F 11/3688; G06F 11/3692; G06F 8/71; G06F 8/36; G06F 8/38; G06F 8/75; G06F 8/77; G06F 9/542
See application file for complete search history.

(56) References Cited

U.S. PATENT DOCUMENTS

| | | | | |
|---|---|---|---|---|
| 5,870,590 | A * | 2/1999 | Kita | G06F 11/3604 716/103 |
| 6,038,378 | A * | 3/2000 | Kita | G06F 11/3684 714/38.11 |
| 9,015,532 | B2 * | 4/2015 | Hong | H04L 43/50 714/28 |
| 9,104,525 | B2 * | 8/2015 | Dang | G06F 8/75 |
| 9,396,046 | B2 * | 7/2016 | Laredo | G06F 9/54 |
| 9,430,200 | B1 * | 8/2016 | Trofin | G06F 8/443 |
| 9,600,401 | B1 * | 3/2017 | Haischt | G06F 11/3664 |

(Continued)

OTHER PUBLICATIONS

Waldermar Hummer et al., Towards efficient measuring of web services API coverage, May 23-24, 2011, [Retrieved on Aug. 12, 2019] . Retrieved from the internet: <URL: https://dl.acm.org/citation.cfm?id=1985398> 7 Pages (22-28) (Year: 2011).*

(Continued)

*Primary Examiner* — Anibal Rivera
(74) *Attorney, Agent, or Firm* — Davis Wright Tremaine LLP

(57) ABSTRACT

Systems and methods are disclosed herein for performing automated testing of software. Information characterizing a set of application programming interface (API) calls is associated with the software. Dependencies between the API calls are determined using the information and a representation is generated using the dependencies. The dependencies of the representation are verified by providing API requests to the API calls. The verified representation is provided for automated testing of an API and the associated API calls.

20 Claims, 14 Drawing Sheets

(56) References Cited

U.S. PATENT DOCUMENTS

| | | | |
|---|---|---|---|
| 9,959,198 B1* | 5/2018 | Jha | G06F 11/3664 |
| 2005/0187930 A1* | 8/2005 | Subramanian | G06F 11/3636 |
| 2005/0193266 A1* | 9/2005 | Subramanian | G06F 11/3664 |
| | | | 714/6.1 |
| 2005/0193291 A1* | 9/2005 | Subramanian | G06F 11/3664 |
| | | | 714/710 |
| 2005/0216921 A1* | 9/2005 | Kataoka | G06F 21/53 |
| | | | 719/328 |
| 2008/0082974 A1* | 4/2008 | Ellison | G06F 8/71 |
| | | | 717/170 |
| 2009/0235285 A1* | 9/2009 | Kim | G06F 16/9027 |
| | | | 719/328 |
| 2011/0264961 A1* | 10/2011 | Hong | H04L 43/50 |
| | | | 714/38.1 |
| 2014/0304678 A1* | 10/2014 | Zhang | G06F 8/36 |
| | | | 717/105 |
| 2015/0121401 A1* | 4/2015 | Laredo | G06F 9/54 |
| | | | 719/328 |
| 2016/0019102 A1* | 1/2016 | Cui | G06F 9/542 |
| | | | 719/328 |
| 2016/0057207 A1* | 2/2016 | Li | H04N 21/4431 |
| | | | 709/203 |
| 2016/0147578 A1* | 5/2016 | Biesack | G06F 9/541 |
| | | | 719/328 |
| 2017/0034023 A1* | 2/2017 | Nickolov | H04L 43/0817 |
| 2017/0337052 A1* | 11/2017 | Elkabany | G06F 8/71 |
| 2018/0113794 A1* | 4/2018 | Yang | G06T 11/00 |
| 2018/0300228 A1* | 10/2018 | Beyel, III | G06F 11/3692 |
| 2019/0065349 A1* | 2/2019 | Sharma | G06F 11/3688 |
| 2019/0188121 A1* | 6/2019 | Simon | G06F 11/3692 |

OTHER PUBLICATIONS

The Open University, A BASILar Approach for Building Web APIs on top of SPARQL Endpoints, 2015, [Retrieved on Aug. 12, 2019]. Retrieved from the internet: <URL: https://oro.open.ac.uk/44026/1/Untitled.pdf> 12 Pages (21-32) (Year: 2015).*

"Peach Fuzzer: Discover Unknown Vulnerabilities," © 2019 Peach Tech, <https://www.peach.tech> [retrieved Apr. 10, 2019], 6 pages.

"American Fuzzy Lop," <http://lcamtuf.coredump.cx/afl> [retrieved Apr. 10, 2019], 6 pages.

* cited by examiner

REPRESENTATION-BASED AUTOMATED SOFTWARE TESTING

BACKGROUND

To meet the ever-growing demand of consumer needs, the pace at which software is developed is rapidly increasing. In the realm of cloud-based services, for instance, new web-based applications and services are constantly being developed to satisfy the demands of businesses and consumers alike. Testing new software helps ensure that the quality of the software is sufficient to meet or exceed user expectations. Testing, however, can be a challenging and resource-intensive endeavor. Testing a new software product can consume a significant amount of time and resources to properly set up and execute. For instance, testing a new software product may require development of a procedure particular to the software product, which may require hours of human labor to produce.

BRIEF DESCRIPTION OF THE DRAWINGS

Various techniques will be described with reference to the drawings, in which.

DETAILED DESCRIPTION

Figure 1:
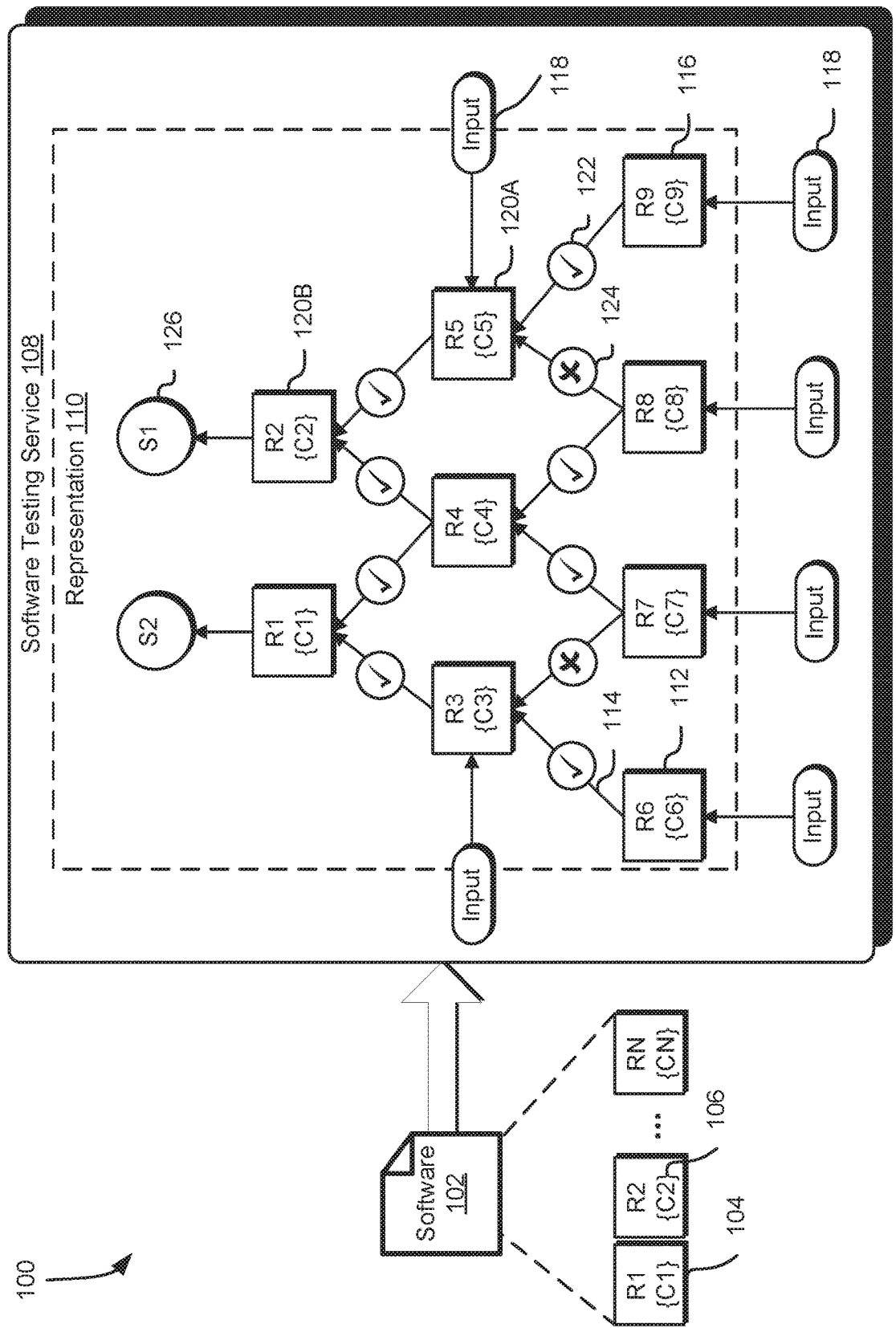
FIG. 1 illustrates an environment in which software may be tested according to one or more embodiments.

Techniques described and suggested herein include methods, systems, and processes for automated testing of software using a representation generated based on resources dependencies of the software. Automated testing may be performed by a testing service of a computing resources service provider. The testing service may obtain service or application software of a service of the computing resource service provider for testing. In one embodiment described herein, for instance, the software is an application programming interface ("API") comprising a set of API calls. An API call schema may be associated with one or more of the API calls defining a set of constraints for communications with and between the API calls. The set of constraints may include constraints on inputs to and/or outputs from the API calls. The testing service may generate dependency information by at least determining dependencies between the API calls using the schema by determining matches between constraints of API calls. Matches may be determined based on similarity of one API call constraint to another API call constraint. Generating dependency information may also include generating information identifying API calls that do not have a dependency on another API calls by determining whether the API calls produce a valid output as a result of providing an input satisfying one or more of the set of constraints.

The testing service may use the dependency information to generate a graph representation or equivalent structure illustrating or describing relationships between the representing dependency relationships between the API calls. The graph representation may be implemented using a table, a matrix, a set of matrices, one or more systems of equations, a tree or set of trees and/or a combination of such similar structures that show the dependency relationships. The graph representation may include nodes corresponding to the API calls and edges corresponding to the dependency relationships between the API calls. Some of the nodes may be origin nodes corresponding to API calls that do not have a dependency on another API call.

As a result of generating the graph representation, the testing service may verify the graph representation to determine which edges are accurate edges and which edges are inaccurate edges. Verification by the testing service may include generating and providing one or more valid inputs to the API calls corresponding to the origin nodes and obtaining and storing the corresponding valid output produced from the API calls in response to the valid inputs. Valid inputs may be determined using the schema of the API calls, and may be inputs conforming to the set of constraints. The valid outputs may be provided in API requests to API calls indicated, in the graph representation, as being dependent on the corresponding origin node API calls. The valid outputs may be provided as API requests to the dependent API calls in combination with other input parameters generated using schema specifying input characteristics of the API call. Accurate dependency relationships may be determined based on a valid output being produced by the API call as a result of the API request. On the other hand, inaccurate dependency relationships may be determined based on an invalid output being produced by the API call as a result of the API request. Edges corresponding to inaccurate dependency relationships may be removed from the graph representation whereas edges corresponding to accurate dependency relationships may be maintained in the graph representation.

As a result of determining and removing all the edges corresponding to the inaccurate dependency relationships and/or confirming the accurate dependency relationship edges, the testing service may use the graph representation to test the API calls. The testing service may generate and provide API requests to the API calls of the API service or application software to identify instabilities, bugs, and other issues associated therewith. The API requests generated may include input parameters previously obtained as valid outputs during verification of the graph representation. The API requests may comprise the input parameters and randomly or otherwise generated inputs to test for bugs and instabilities. As a result of sufficiently testing the API calls, the testing service may notify an authorized entity of any bugs or instabilities detected in the API service or application software.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 in which resources, entities, inputs, outputs, and/or dependencies of software 102 of a distributed and/or virtualized computing system may be represented and analyzed in accordance with one or more embodiments. The software 102 may be tested by a software testing service 108 to discover errors, failures, flaws, or other bugs of the software 102. The software 102 may comprise a set of resources 104 corresponding to one or more operations of a web service or application of a computing resource service provider. A set of constraints 106 particular to each resource 104 may be associated with or included in each of the set of resource 104. The set of constraints 106 may specify various aspects of the corresponding resource 104, such as a constraint on an input that the resource is configured to successfully process, a constraint on an output that the corresponding resource 104 is configured to produce, or a constraint on an operation that the resource 104 is configured to perform using a valid input, by way of non-limiting example. In one embodiment, the set of resources 104 correspond to application programming interface ("API") calls of an API of a web service or application, and the constraint 106 may correspond to a constraint associated with individual API calls.

A software testing service 108 may receive the software 102 as a part of, or in association with, a request to test the software 102. The software testing service 108 may be a computer system comprising one or more processors and executable instructions that, as a result of execution by the one or more processors, cause the software testing service 108 to perform the operations described herein. The request and/or the software 102 may be received over a network connected to the software testing service 108, and may be provided by an entity authorized to access the software testing service 108, such as a developer, programmer, or system administrator, for example. The network may include a protected network of the computing resource service provider, which may be connected to access an unprotected network, such as the internet.

The software testing service 108 may generate a representation 110 identifying resources and dependencies between the resources. Nodes 112 of the representation 110 correspond to individual resources, and edges 114 of the representation 110 correspond to dependencies between individual resources. A dependency, as referred to herein, is defined as a relationship between two or more resources in which a first resource receives, as an input, an output provided by a second resource. The first resource may, as a result of receiving the output of the other resource, itself provide an output based at least in part on the input provided by the second resource. The software testing service 108 may determine the dependencies based at least in part on the set of constraints 106 associated with the resources. Some of the nodes 112 may be origin nodes 116 that are nodes not having any reverse dependencies, such that the origin nodes 116 correspond to resources that are not dependent upon another resource to produce an output. Some of the nodes 112 may be dependent nodes 120 that have one or more reverse dependencies associated therewith; that is, the dependent nodes 116 correspond to resources that use the output of one or more other resources as inputs.

The software testing service 108 may, as a result of generating an initial representation, verify various aspects of the initial representation. The software testing service 108 may verify that each edge 114 of the representation 110 is accurate by providing an input 118 to one or more of the origin nodes 116 to generate an output of the origin nodes. The output of the origin node 116 may be used, at least in part, as an input to one of the dependent nodes 120. An edge may be identified as an accurate edge 122 as a result of a dependent node 120A generating a valid output using the input from the origin node 116. Conversely, an edge 114 may be identified as being an inaccurate edge 124 as a result of the dependent node 120A generating one or more invalid outputs using the input from the origin node 116. The software testing service 108 may remove inaccurate edges 124 from the initial representation whereas accurate edges 122 may be maintained in the initial representation as being verified. The software testing service 108 may traverse all the edges 114 in the initial representation to identify accurate edges 122 and inaccurate edges 124. For instance, the software testing service 108 may use a valid output generated by the dependent resource 120A as an input to a second dependent node 120B, and, as a result of the second dependent node 120B generating a valid output, an edge 114 connecting the dependent resource 120A and the second dependent resource 120B may be verified as being an accurate edge 122. Generating the output of a dependent node 120 may include introducing an input 118 corresponding to a constraint 106 associated with the dependent node 120.

A state 126 may be achieved by generating a valid output from a dependent node 120 or an origin node 116. For example, a valid output produced by the second dependent node 120 may result in production of a state 126 by an API call. A state produced by an API call is a stable condition of a system produced as a result of a set of operations performed involving one or more inputs. Examples of a state 126, as described herein, may refer to one or more operations resulting in manipulation of a data object, reading a data object, creation of a data object, or moving a data object from one location in data storage to another data storage location. One particular example of a state 126 may be a "get" operation in which one or more data objects are obtained from memory and provided to a specified destination or entity. Sub-representations of the representation 110 that comprise less than the entire representation 110 may correspond to collections of resources 104 that are useable to produce a particular state 126. The software testing system 110 may remove the inaccurate edges 124 and keep the accurate edges 122 as part of a representation 110 that is useable to test the resources 104 associated therewith. For instance, random inputs following the set of constraints 106 of a particular resource 104 may be provided to that resource 104 to test the resource 104 for bugs. Any bugs produced may be reported to an appropriate authorized entity, such as a developer, programmer, or system administrator. The software testing system 108 may therefore facilitate testing of a software 102 using minimal human interaction. Accordingly, a testing procedure for testing a proposed software, such as the software 102, may be implemented in an automated manner without the onerous processes of designing and executing the testing procedure.

Figure 2:
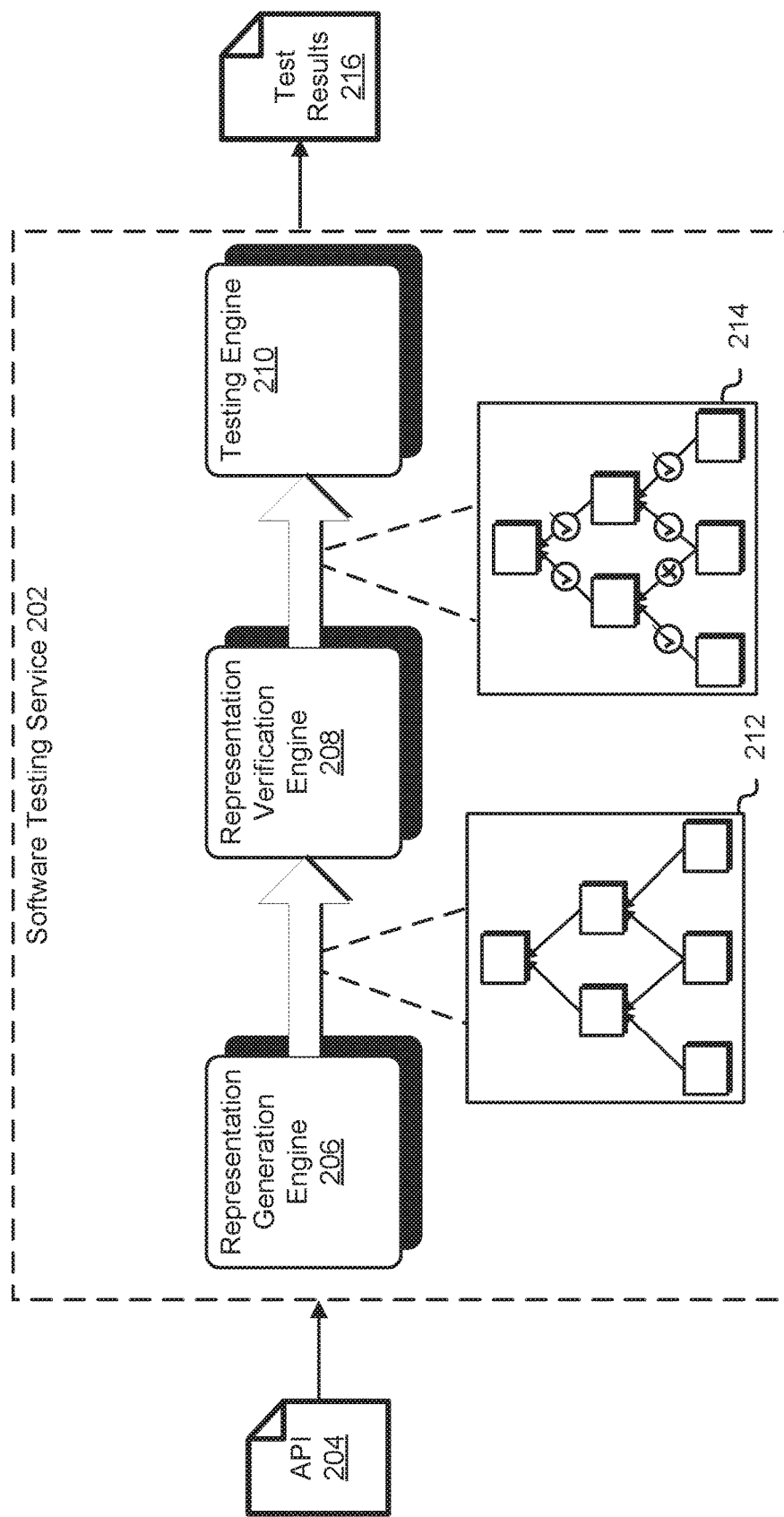
FIG. 2 illustrates an environment in which a testing service of a computing resources service provider tests software according to one or more embodiments.

FIG. 2 shows an environment 200 in which a software testing service 202 tests a software, such as an API 204, in accordance with one or more embodiments described herein. The software testing service 202 may comprise a representation generation engine 206, a representation verification engine 208, and a testing engine 210. Although the software testing service 202 depicted comprises several components, the software testing service 202 may comprise more or fewer components in other embodiments. The software testing service 202 obtains the API 204 to be tested via an interface of the testing service 202, such as an API.

The representation generation engine 206, in an embodiment, is a computer system that generates a representation 212 of dependency relationships of the API calls of the API 204 based at least in part on schema associated with the API calls. A computer system, as referred to herein, is a system that can be implemented using hardware and software. The computer system may comprise one or more separate computing devices (e.g., servers, personal computing machine, virtual machine) including a processor and data storage. The representation generation engine 206 is a computer system comprising executable instructions stored on memory that, as a result of being executed on one or more processors of the representation generation engine 206, cause the representation generation engine 206 to perform the operations described herein. To determine the dependency relationships, the representation generation engine 206 may systematically compare characteristics of output schema of API calls with characteristics of input schema of other API calls to identify matches or similarities there between. As a result of detecting a dependency relationship, the representation generation engine 206 may place, in the representation 212, edges connecting nodes corresponding to API calls of the API 204.

The representation generation engine 206 may provide the representation 212 to the representation verification engine 208 as a result of determining the dependency relationships between the API calls. The representation verification engine 208, in one embodiment, is a computer system comprising executable instructions stored on memory that, as a result of being executed on one or more processors of the representation verification engine 208, cause the representation verification engine 208 to perform the operations described herein. The representation verification engine 208 may verify the dependency relationships by generating API requests to API calls corresponding to origin nodes and obtaining the resulting origin node output. The API requests may be generated according to input constraints of the origin node API calls. The origin node output may then be used to generate API requests to dependent API calls indicated in the representation 212 as having a dependency on the origin node API calls. If the dependent API calls produce valid output, the dependency relationship is indicated by the representation verification engine 208 as being confirmed as an accurate dependency relationship. Conversely, if the dependent API calls produce invalid output, the dependency relationship is determined as being inaccurate. An updated representation 214 may be generated based on the results of the verification wherein the edges corresponding to inaccurate dependency relationships are removed.

The updated representation 214 is provided to the testing engine 210 for testing the API 204. The testing engine, in one embodiment, is a computer system comprising executable instructions stored on memory that, as a result of being executed on one or more processors of the testing engine 210, cause the testing engine 210 to perform the operations described herein. The testing engine 210 is configured to identify bugs and instabilities in the API 204 by providing API requests to the API calls based at least in part on the updated representation 214 and the schema for the API calls, as described below in greater detail. The testing engine 210 may produce test results 216 identifying bugs and/or instabilities detected in the API 204, and the conditions giving rise to the bugs and/or instabilities (e.g., input provided to the API calls). The test results 216 may be information transmitted or provided over a network to an authorized entity. It should be noted that, in one embodiment, one or more of the representation generation engine 206, the representation verification engine 208, and the testing engine 210 may be implemented on the same computer system. In one embodiment, one or more of the representation generation engine 206, the representation verification engine 208, and the testing engine 210 may be implemented on more than one computer system.

Figure 3:
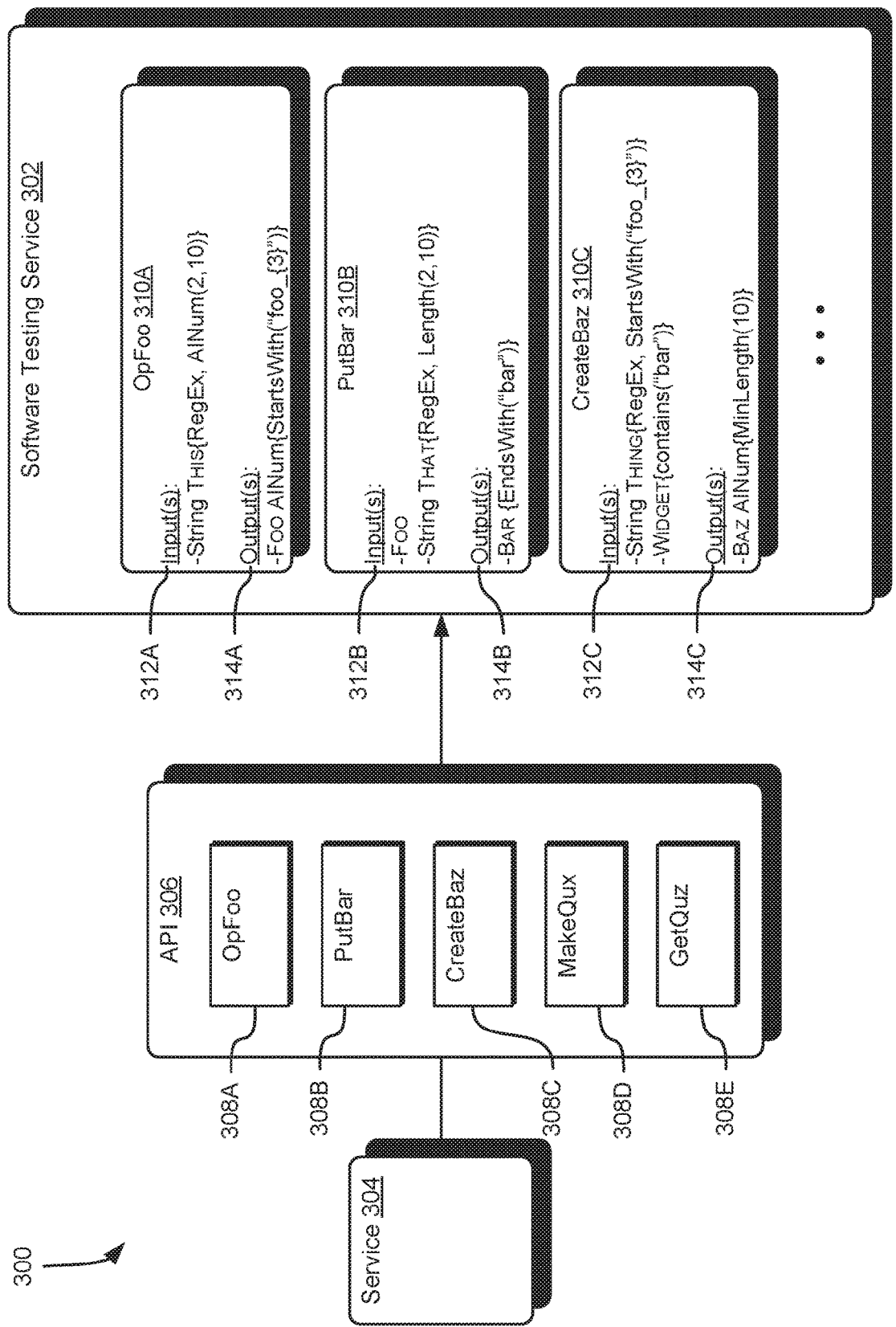
FIG. 3 illustrates an environment in which the testing services obtains and analyzes schema associated with an API according to one or more embodiments.

FIG. 3 shows an environment 300 in which a software testing service 302 tests a software according to one or more embodiments. The processes and operations described with respect to the environment 300 may be part of a process of generating a representation for determining relationships between resources of software being tested. The processes and operations described with respect to the environment 300 may, for example, be performed by a representation generation engine of the software testing service 302. The testing service 302 may receive software of an application or service 304 of a computing resource service provider. Testing of software is described with reference to an application programming interface ("API") of a web service; however, the present disclosure may extend to software in other services and applications comprising computing resources that have defined schema using, as input, an output from another resource. The present disclosure may also extend to software having components that can be independently invoked for processing input to produce an output in a manner similar to API calls. A schema, as used herein, refers to information describing a set of protocols for communicating with the resource, including the organization of elements and/or attributes of data used to communicate with the resource. A schema may include, for example, a set of constraints on a set of inputs for which a resource is configured to produce a valid output, and a set of constraints on a set of outputs that the resource is configured to produce given the set of valid inputs. The set of constraints may relate to the name, pattern, type, and structure of the input and/or output, as described below.

The testing service 302 may obtain an API 306 to be tested from the service 304. The API 306 may be included in, or be associated with, a request to test one or more features of the API 306. The API 306 may include a set of API calls 308 that may be invoked at runtime to perform various operations. The software testing service 302 may obtain, for the API 306, a set of schema 310 corresponding to the API calls 308. In one embodiment, the schema 310 may be included as part of the API 306 or API calls 308—for example, the schema 310 may be metadata or data included in or attached to the respective API calls 308. In one embodiment, the schema 310 may be obtained from data storage (e.g., data base, memory) of the computing resource service provider. For instance, the testing service 302 may obtain one or more of the set of schema 310 by requesting the set of schema 310 from the service 304, or by initiating a database query to a database storing the set of schema 310 using identification information of the API 306 or API calls 308 with which the respective schema 310 are associated.

The software testing service 302 may identify, for each API schema 310 obtained, a set of input schema 312 and output schema 314. The input schema 312 may represent attributes and elements of an input that the corresponding API call 308 is configured to process as valid input for the corresponding API call 308. The output schema 314 may represent attributes and elements of an output that the corresponding API call 308 is configured to produce as a result of receiving and processing valid input. These attributes and elements may correspond to a set of constraints associated with the API call 308. Examples of other constraints include constraints on an operation that the API call 308 is configured to perform, constraints on computing resources (e.g., APIs, API calls) with which the corresponding API call 308 is configured to interact, and constraints on syntax, communication, and data types, by way of non-limiting example.

In the environment 300, by way of illustrative example, a schema 310A for an OpFoo API call 308A includes an input schema 312A of "String This{RegEx, AlNum(2,10)}". The input schema 312A indicates that the OpFoo API call 308A may accept an input of a data type "string", that the input provided is a regular expression ("RegEx"), that the input has a length of between two and ten alphanumeric characters ("AlNum(2,10)"), and that the input will be designated as having a name "This". The output schema 314A indicates that the OpFoo API call 308, as a result of processing a valid input satisfying the input schema 312A, may produce an output designated as having a name "Foo", the output being comprised of alphanumeric characters. The output schema 314A also indicates that the output will have a particular pattern and constraint; namely, that the output will have a starting pattern of "foo_" and be followed by three alphanumeric characters ("{3}"). A schema 310B for a PutBar API call 308B and a schema 310C for a CreateBaz API call 310C depicted in the environment 300 also indicate various elements and attributes that constrain the inputs and outputs that the respective API calls 308 are configured to process and produce. It should be noted that the software testing service 302 may obtain schema for other resources, such as API calls of other services, that are not part of the application or service 304, but which the API calls 308 use to process inputs and/or produce an output.

Figure 4:
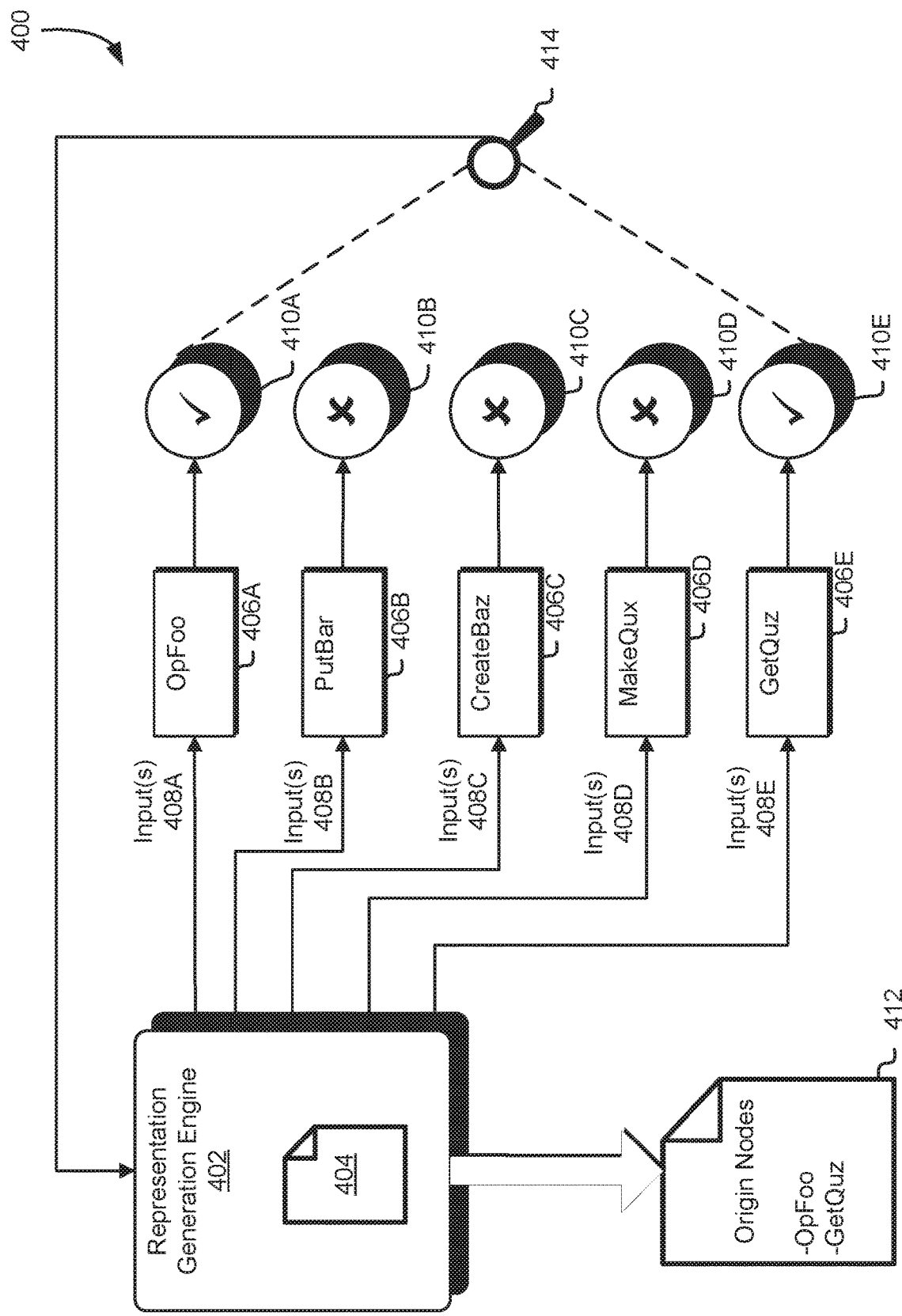
FIG. 4 illustrates an environment in which the testing service determines a set of API calls corresponding to origin nodes of a representation to be generated according to one or more embodiments.

FIG. 4 illustrates an environment 400 in which a representation generation engine 402 of a software testing system identifies origin nodes of a representation for testing a software. The representation generation engine 402 may use a set of schema 404, corresponding to the schema discussed above with respect to FIG. 3, for a set of API calls 406 of an API to determine which of the API calls 406 correspond to origin nodes of a representation. Origin nodes, as used herein, refer to nodes of a representation that correspond to resources that do not depend upon receiving an output of another resource to produce an output. For instance, an API call that receives one or more inputs from a user, service, or application to produce an output rather than receiving an output from another API call within the same API to produce an output. The representation generation engine 402 may analyze the set of schema 404 to determine a set of inputs 408 to provide to the API calls 406. The representation generation engine 402 may determine, for each API call 406, one or more inputs 408 that satisfy one or more criteria of the set of schema 404. However, for some of the API calls 406, it may not be possible to determine an input that satisfies all of the criteria specified in the corresponding schema 410 because, for example, because the schema 410 may not specify a data type, a size, or a pattern to be included in the input.

For the OpFoo API call 406A, for instance, the representation generation engine 402 may determine a set of inputs 408A that satisfy the input schema 312A indicated in FIG. 3, as follows:

{String This(Reg Ex, AlNum(2,10)}

From this input schema, the representation generation engine 402 may determine that the OpFoo API call 406A takes in an input of a string data type that is a regular expression and that is between two and ten characters in length. The representation generation engine 402 may generate an input 408A according to the constraints specified in the schema associated with the OpFoo API call. The input generated, in one embodiment, may be a random input—for example, a random input "Ac3U9" is an input of string data type that is a regular expression and that is between two and ten characters in length. By contrast, the input schema 312B for the PutBar API call 310B indicates that the PutBar API call 310B takes in two inputs; (1) 'Foo', and (2) 'That', to produce one output, 'Bar'. Although the input schema 312B for the PutBar API call 406B is sufficient to determine an input to generate for the 'That" input, the input schema 312B does not specify constraints for the "Foo" input sufficient to enable the representation generation engine 402 to generate an input. The representation generation engine therefore may generate a set of random inputs satisfying the 'That' input, and a set of random inputs for the 'Foo' input of the PutBar API call 406B. The representation generation engine 402 may generate a set of inputs for each of the API calls 406 in a similar manner.

In one embodiment, the representation generation engine 402 may generate inputs 408 to the API calls 406 based on a set of rules for generating input based on conditions detected in the associated schema. The set of rules may be user-defined rules that define input values, data types, patterns, and/or structures that should be provided to an API call as a result of detecting one or more conditions in the schema associated with the API call. For instance, the set of rules may dictate that, for an API call having an associated input schema including a certain word, inputs having predetermined characteristics should be provided to corresponding parameters or variables of the API call. For an input schema containing the word "volume" in the input, the representation generation engine 402 may determine that a volume size and/or a volume name may be input parameters of the API call. Accordingly, the set of rules may indicate that a particular volume size integer should be provided for a corresponding integer parameter of the input schema, and a particular volume name should be provided for a corresponding string parameter of the input schema. The set of rules for generating input may apply to any appropriate API input, such as rules related to providing inputs for virtual machine instantiation (e.g., where "VM" is detected in an input schema), data storage or backup (e.g., where "snapshot" is detected in an input schema), or the like. The representation generation engine 402 may provide inputs to the API calls 406 based on the set of rules. The set of rules may include a default case for providing inputs if none of the specified rules apply, such as providing a randomly generated string generated according to an input schema specifying a string data type input.

The representation generation engine 402 may provide the inputs 406 generated to the respective API calls 406 and obtain an output 410 produced corresponding to the input 406. The representation generation engine 402 may analyze the outputs 410 respectively produced by the API calls 406 using the inputs 408 generated according to the set of schema 404 to identify API calls 406 corresponding to origin nodes of a representation. Determination of whether an API call 406 is an origin node may be based on whether the output 410 produced is a valid output, and/or status information associated with the output 410. The status information may include, for example a HyperText Transfer Protocol ("HTTP") response status code indicating whether the corresponding input (e.g., HTTP request) has been successfully completed or fulfilled. For example, status information including a status identifier of '200' indicates that the corresponding API call 406 successfully completed or processed a request including the input 408. Conversely, status information including a status identifier of '400' indicates that the API call 406 cannot or will not process the input 408 due to client error (e.g., the input 408 having a malformed request syntax that does not satisfy the set of schema 404). For outputs 410 having an indication of successful completion, the representation generation engine 402 may store the outputs 410 for use in validating a representation generated.

As an illustrative example described with respect to the environment 400, the representation generation engine 402 may analyze 414 for each of the API calls 406, a set of outputs 410 corresponding to a set of inputs 408. The representation generation engine 402 may determine that set of outputs 410A corresponding to the set of inputs 408A to the OpFoo API call 406A include or are associated with status information indicating that an output 410A was produced as a result of successfully processing the set of inputs 408A. In particular, successful processing of the set of inputs 408A may be a result of production of a valid output 410A satisfying the set of constraints of the output schema 314A discussed above.

As a result of determining that a valid output 410A was produced or determining that the status information associated with the output 410A indicates successful completion, the representation generation engine 402 may identify the corresponding API call—the OpFoo API call 406A—as being an origin node of the representation of the API being tested. The representation generation engine 402 may also determine that a GetQuz API call 406E corresponds to an origin node based on a set of outputs 410E produced as a result of providing a set of inputs 408E to the GetQuz API call 406E satisfying a set of constraints indicated in schema for the GetQuz API call 406. On the other hand, the representation generation engine 402 may determine that the outputs 410B, 410C, and 410D from the other API calls 406 (i.e., the PutBar API call 406B, the CreateBaz API call 406C, and the MakeQux API call 406D) do not include an indication of successful completion of an API call and do not correspond to a valid output satisfying the set of constraints of a corresponding output schema. Therefore, the representation generation engine 402 may determine that the PutBar API call 406B, the CreateBaz API call 406C, and the MakeQux API call 406D do not correspond to origin nodes of the representation for the API being tested. The representation generation engine 402 may generate information 412 identifying the API calls 406 corresponding to origin nodes based on a result of the analysis 414.

Figure 5:
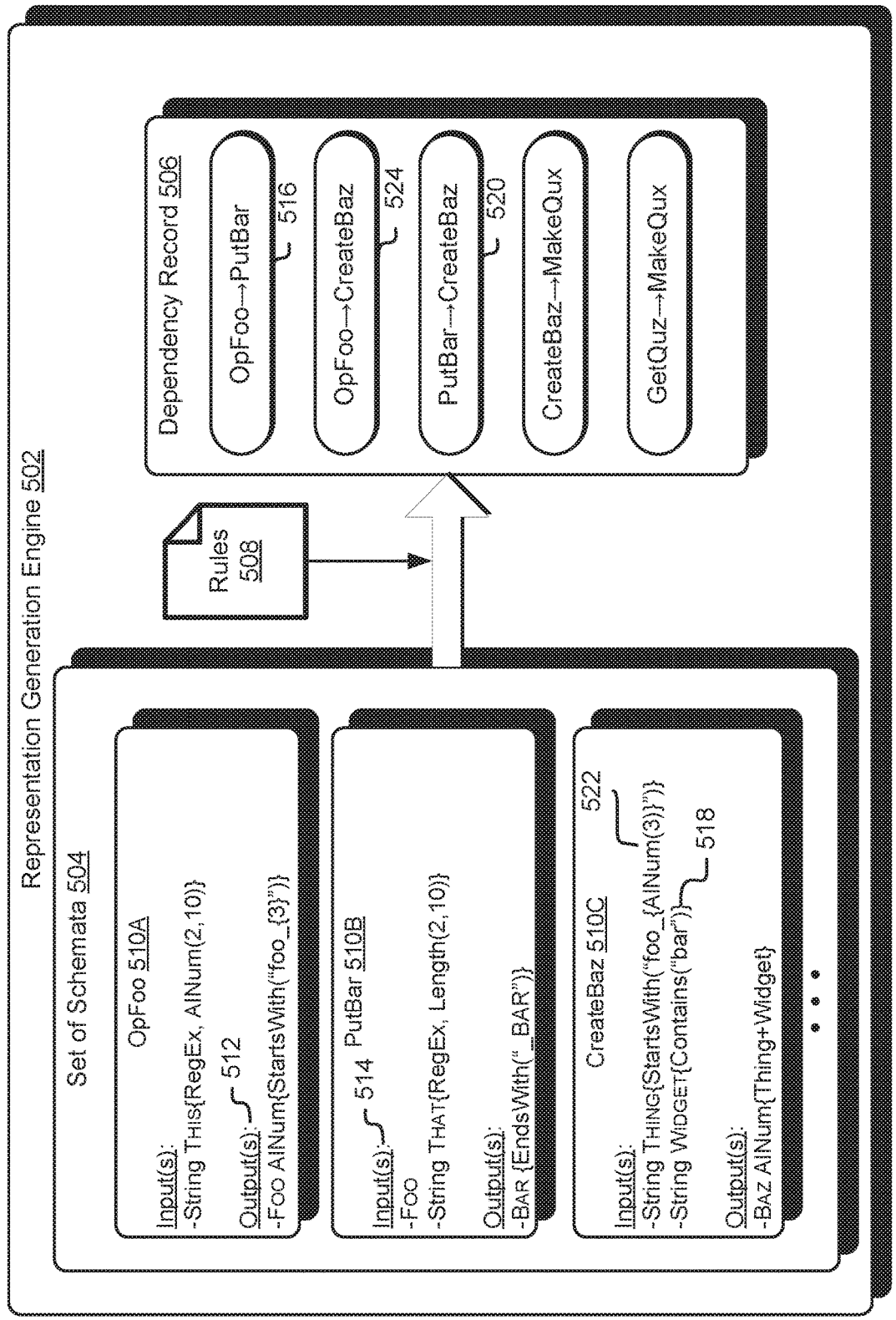
FIG. 5 illustrates an environment in which the testing service determines dependency relationships between API calls according to one or more embodiments.

FIG. 5 shows an environment 500 in which a representation generation engine 502 of a software testing service generates associations between resources using sets of schema associated with the resources. The representation generation engine 502 may analyze a set of schemata 504 to determine one or more API call dependencies corresponding to edges between nodes in a representation. The analysis performed to determine the API call associations may involve a set of rules 508 for identifying associated resources. The set of rules 508 may define conditions that, as a result of being detected in association with two or more resources, indicate a possible association between the two or more resources. The set of rules 508 may involve associations of content, patterns, classification, and/or structures of two or more resources that indicate a dependency between the resources. An association may be identified by detecting an element, attribute, or characteristic in an output schema of one API call that is similar to or matches an element, attribute, or characteristic in an input schema of another API call. A similarity between a parameter or variable name of an output schema of a first API call to a parameter or variable name of an input schema in a second API call may indicate a dependency of the second API call on the first API call. Similarity may be measured in various ways in accordance with various embodiments, such as by using string similarity measures, string metrics, edit distance, Levenshtein distance, Lee distance, or Hamming distance, by way of non-limiting example, or heuristics that depend at least in part on measures of similarity.

An illustration of various associations identified in the set of schema 504 for the API calls described above with respect to FIG. 3 will now be presented for the environment 500. The representation generation engine 502 may determine API call associations by comparing, in view of the set of rules 508, an output schema of each API call with an input schema of the other API calls. One of the set of rules 508 may define a dependency between a pair of resources where a parameter or variable name of an output schema of one resource is similar to a parameter or variable name of an input schema of another resource. A parameter name in an output schema 512 of the OpFoo API call schema 510A, 'Foo', is identical to a parameter name in an input schema 514 of the PutBar API call schema 510B. Accordingly, the representation generation engine 502 may determine that an API call dependency 516 exists between the OpFoo API call and the PutBar API call. A second rule of the rules 508 may define a dependency between a pair of resources based on a similarity in a pattern associated with the input/output schemas of API calls. For instance, the argument of the output schema 512 of the OpFoo API call schema 510A is similar to an input schema 518 of a CreateBaz API call schema 510C. The representation generation service 502 may therefore determine that an API call dependency 520 exists between the OpFoo API call and the CreateBaz API call. A third rule of the rules 508 may define a dependency between resources based on a similarity in structure between an output schema of one API call and an input schema of another API call. A structure may be defined as one or more constraints in combination with one or more patterns—for example, a parameter having a variable argument in combination with a fixed argument. The output schema 512 has an argument with a structure, 'foo_{3}', similar to an argument of a second input schema 522 of the CreateBaz API call schema 510C. Thus, the representation generation engine 502 may determine that an API call dependency 524 exists between the OpFoo API call and the CreateBaz API call. The dependencies determined may be maintained in a dependency record 506 stored in memory accessible by the representation generation engine.

The set of rules 508 may include rules related to detection of dependencies based on other conditions. The set of rules 508 may define a dependency of one resource as a result of a logic condition associated with another resource. For example, an operation performed by one API call may be based upon whether an output of another API call included a particular argument or parameter. The set of rules 508 may also relate to various constraints associated with the input and output of the corresponding API calls, such as whether an output of an API call has a value with a particular range of values or has a length within a particular range. Another constraint associated with the set of rules 508 may be whether the output schema of one API call matches a regular expression corresponding to the input schema of another API call. These examples regarding various aspects of the set of rules 508 are illustrative of the myriad rules that may be implemented to identify dependencies between resources, and are not intended to be limiting.

Figure 6:
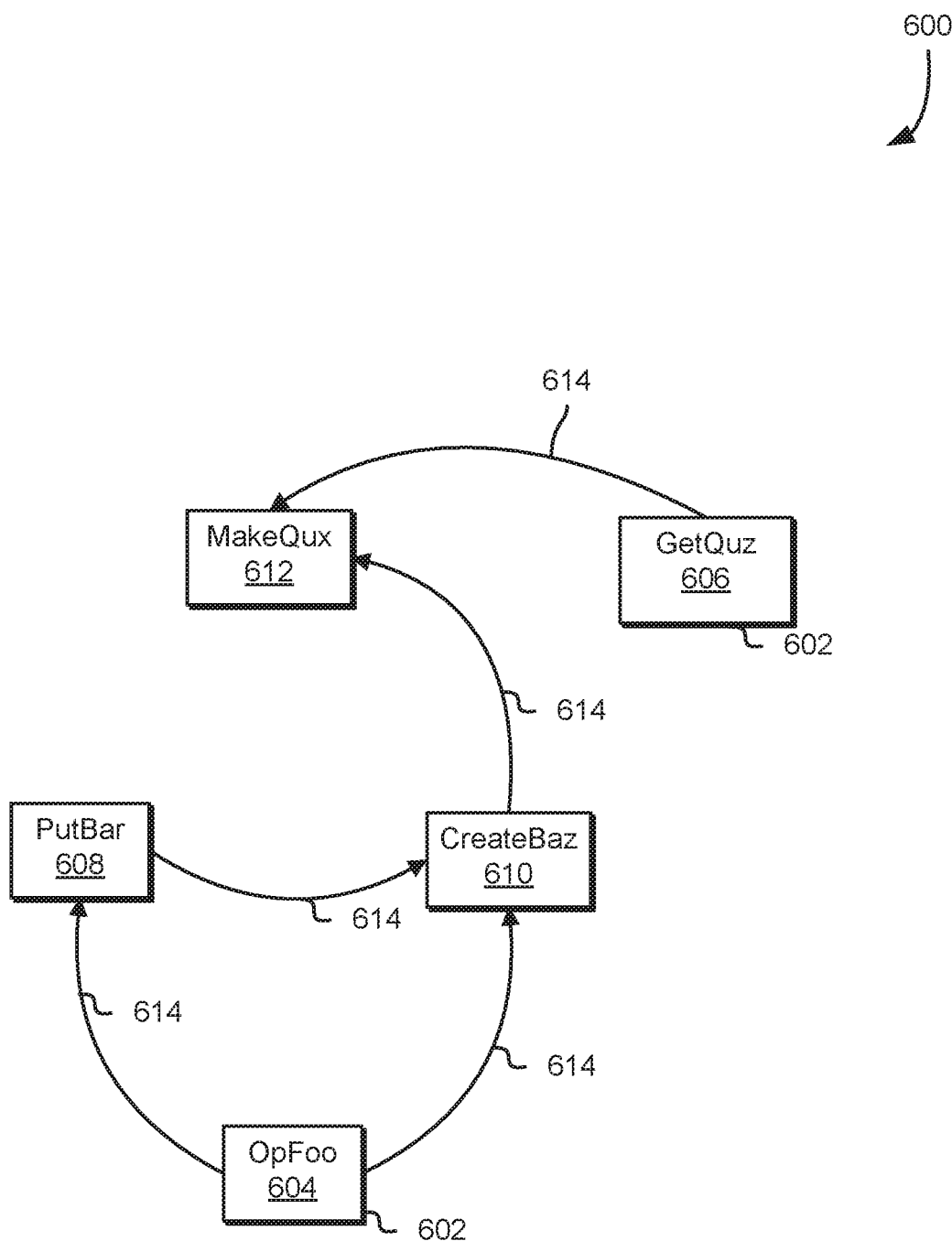
FIG. 6 illustrates an initial representation generated based at least in part on the dependency relationships.

FIG. 6 shows an initial representation 600 generated by a representation generation engine of a software testing service in accordance with one or more embodiments described herein. The initial representation 600 may be generated as a result of identification of the resource schemas, identification of the origin nodes, and determination of the resource dependences, as described above with respect to FIGS. 3, 4, and 5, respectively. The initial representation 600 may represent a first iteration of a determination of dependency relationships of the resources of software being tested. The representation generation engine may first place the origin nodes 602 of the initial representation 600. Specifically, the representation generation engine may place the OpFoo API call 604 and the GetQuz API call 606 on the initial representation 600, which were identified as corresponding to the origin nodes 602 according to the description associated with FIG. 4. Next, the representation generation engine may place nodes corresponding to those API calls that have dependencies from the origin nodes 602. In this example, the PutBar API call 608 and the CreateBaz API call 610 are placed and indicated as having a dependency 614 on the OpFoo call 604. Similarly, the MakeQux 612 is placed and indicated as having a dependency 614 on the GetQuz API call 606.

The representation generation engine iteratively places and identifies dependencies 614 between resources until all dependency relationships in the dependency record 506 are represented. For instance, as an additional iteration, the representation generation engine may represent the dependency 614 of CreateBaz API call 610 upon the PutBar API call 608, and may represent the dependency 614 of the MakeQux API call 612 upon the CreateBaz API call 610, as indicated in the dependency record. It should be noted that some of the dependencies 614 in the initial representation 600 may be incorrect. Although some of the dependencies in the dependency record may be correct, other dependencies may be incorrect. After generating the initial representation 600, the software testing service must verify the initial representation 600 to determine which dependencies 614 are correct and which are incorrect.

Figure 7:
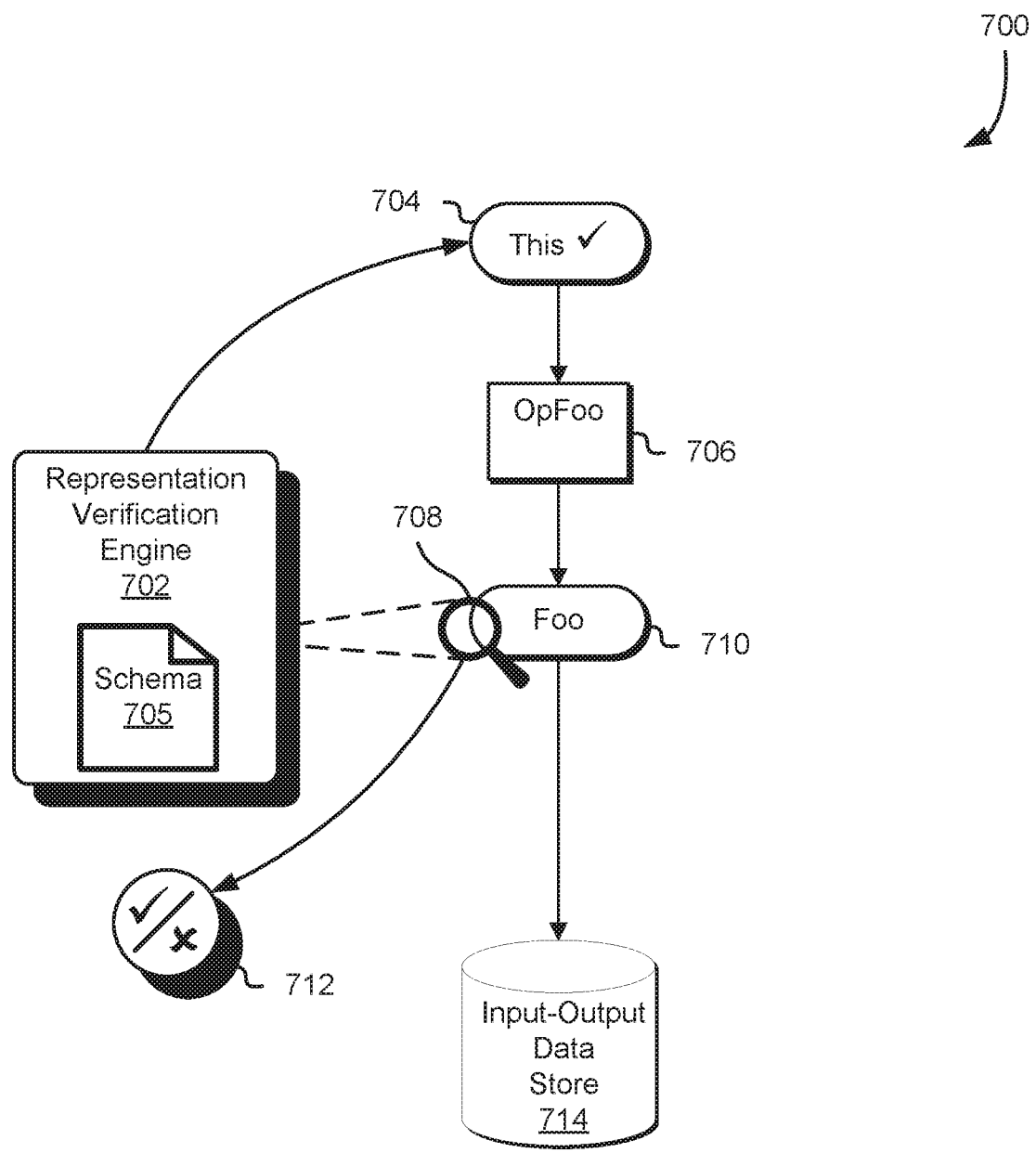
FIG. 7 illustrates an environment in which the testing service generates a state to be used for verifying the representation according to one or more embodiments.

FIG. 7 illustrates an environment 700 in which a representation verification engine 702 of a software testing service verifies dependencies of an initial representation. The representation verification engine 702 provides a set of valid inputs 704 to the resources corresponding to the origin nodes and obtains a set of outputs 708 produced from the resources in response to the valid inputs 704. The representation verification engine 702 may obtain a schema 705 of the OpFoo API call 706 for use in determining valid inputs to provide to the OpFoo API call 706. The representation verification engine 702, in this instance, provides one or more inputs 704, 'This', to the OpFoo API call 706 and analyzes 708 a set of outputs 712 produced as a result. The set of valid inputs 704 are inputs that conform to the input schema of the OpFoo API call 706 described above with respect to FIGS. 3, 4, and 5. The representation verification engine 702 may use the set of rules discussed above with respect to FIG. 4 to generate inputs to one or more of the inputs according to the schema 705. For instance, the set of rules may be user-defined rules defining inputs to be provided to an API call 706 as a result of detecting one or more conditions in the schema 705 (e.g., inputs to generate in response to detecting "volume" in input schema variable, function, or parameter name).

The representation verification engine 702 analyzes 708 the set of outputs 710, 'Foo', produced to determine whether the set of outputs 710 are valid. For instance, the set of outputs 710 may include or be associated with a status identifier 712 indicating a status associated with the corresponding output. The representation verification engine 702 may determine, based on the status identifier 712, whether the corresponding output was produced as a result of successful processing of an input or whether processing of the input failed. As another example, the representation verification engine 702 may determine whether an output 710 produced conforms with an output schema for the corresponding API call 706.

The representation generation engine may store valid outputs in input-output data store 714 in association with the corresponding input that produced the valid output. The valid outputs may be used as inputs to other resources that have a dependency on the API call 706. Invalid outputs, such as outputs associated with a status identifier 712 indicating an error or outputs not conforming to the corresponding output schema, may be stored in the input-output data store 714. The invalid outputs may be identified as being associated with a software bug in the API call 706, and may be reported in a notification to an authorized entity, such as a developer, programmer, or system administrator. The input-output data store 714 may include data storage media capable of storing, accessing and retrieving input and output data, and may include any combination and number of data servers, databases, data storage devices and data storage media, in any standard, distributed, virtual or clustered environment. The representation verification engine 702 may obtain and store a number of outputs 710 to enable sufficient testing of dependent resources to the API call 706. As a result of obtaining and storing a sufficient number of valid outputs 710 to the resources corresponding to origin nodes, the representation verification engine 702 may proceed to verifying the dependencies to the origin nodes in the initial representation.

Figure 8:
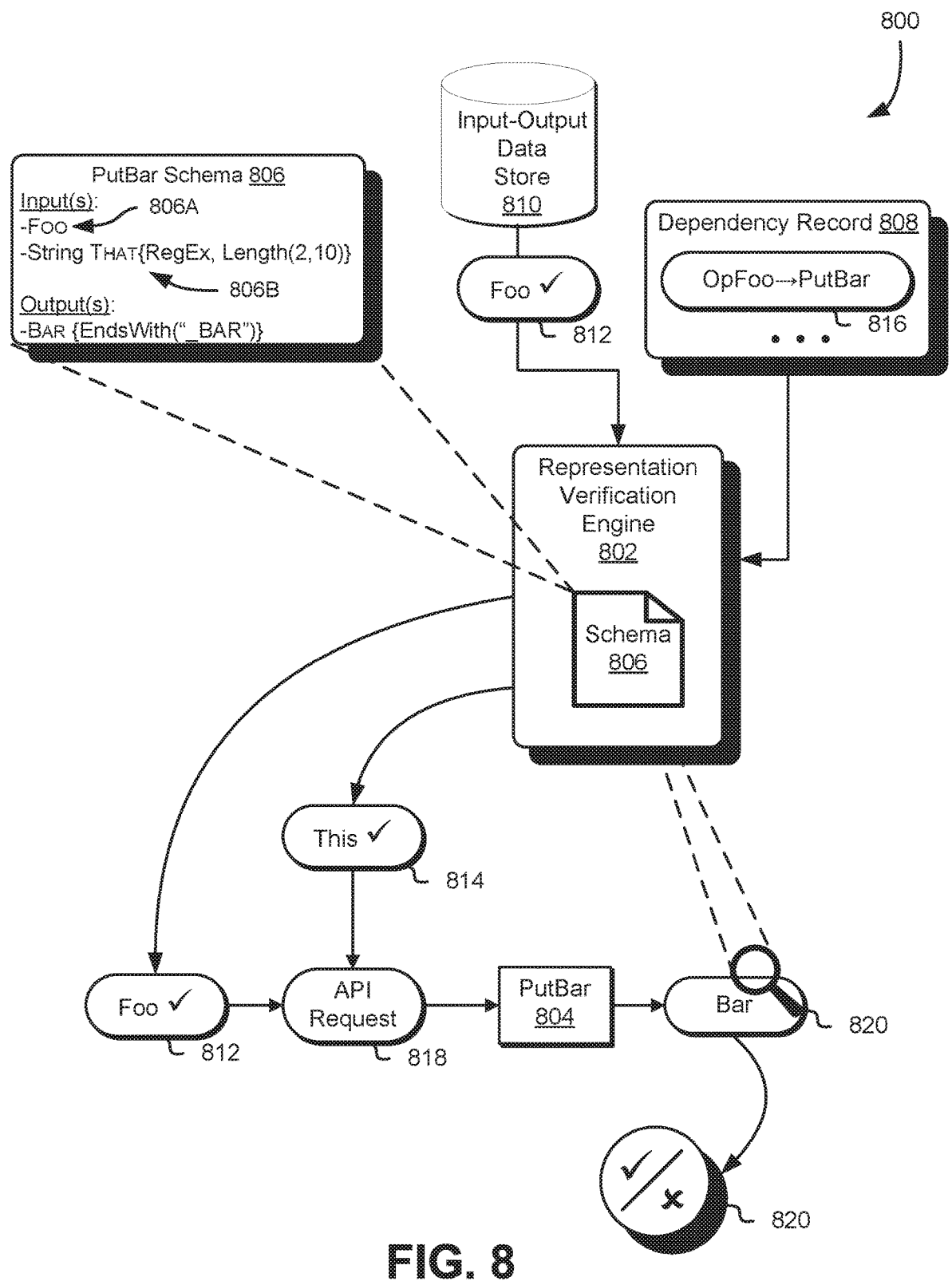
FIG. 8 illustrates an environment in which the testing service verifies an edge of the representation according to one or more embodiments.

FIG. 8 shows an environment 800 in which edges corresponding to resource dependencies in the initial representation are verified in accordance with one or more embodiments. A representation verification engine 802 may identify, using a dependency record 808 and/or the initial representation respectively generated as described in FIGS. 5 and 6, resources identified as having a dependency from the resources corresponding to the origin nodes. The representation verification engine 802 may perform assessments to verify the dependencies of the initial representation. With reference to the dependency record 808, for instance, the representation verification engine 802 may determine that a PutBar API call 804 was determined as having a dependency on the OpFoo API call origin node. The representation verification engine 802 may proceed to verify the dependency of the PutBar API call 804 on the OpFoo API call.

The representation verification engine 802 may obtain a schema 806 for the PutBar API call 804 and use the schema 806 to determine inputs to provide to the PutBar API call 804. The representation verification engine 802 may analyze the schema 806 and determine that the PutBar API call 804 takes in two inputs, 'Foo' and 'That', to produce an output. Based on a dependency 818 in the dependency record 808, the representation verification engine 802 may identify that the 'Foo' input was determined as corresponding to the output of the OpFoo API call. The representation verification engine 802 may verify the dependency 818 by analyzing an output generated by the PutBar API call 804 as a result of providing a set of valid inputs to the PutBar API call 804.

The representation verification engine 802 may obtain, from an input-output data store 810, a set of outputs 812 produced by the OpFoo API call that were determined as being valid outputs (e.g., having a status identifier indicating successful fulfillment of a request). The outputs 812 correspond to a first input schema 806A of the PutBar schema 806. The representation verification engine 802 may also generate a set of inputs 814 determined as satisfying the set of constraints of a second input schema 806B of the PutBar schema 806. The representation verification engine 802 may then combine individual ones of the set of outputs 812 in with individual ones of the set of inputs 814 to generate a set of API requests 818 to the PutBar API call 804 and obtain corresponding outputs 820 thereof. The API requests 818 to the PutBar API call 806 may be formatted according to a syntax defined for the API of the PutBar API call 806, as described herein. For instance, a first output of the set of outputs 812 and a first input of the set of inputs 814 may be combined in an appropriate format defined by an API call format of the API, and provided as a single API request 818 to the PutBar API call 804.

The PutBar API call 804, as a result of receiving the set of API requests 818 may produce a set of outputs 820, 'Bar'. The representation verification engine 802 may analyze the outputs 820 to determine whether the outputs 820 are valid outputs. As described herein, a valid output may have a status identifier 820 indicating successful processing or fulfillment of an API request, and/or may have a format corresponding to the output schema of the API call. For instance, an output 820 having a '200' status identifier may indicate that the API request 818 was fulfilled. By contrast, an invalid output may have a status indicating unsuccessful processing or fulfillment of an API request (e.g., '400' HTTP response), and/or may have a format not conforming to the corresponding output schema. As a result of determining one or more of the API requests 818 generated produced a valid output 820, the representation verification engine 802 may determine that the edge of the initial representation corresponding to the dependency 816 is verified as an accurate dependency. In one embodiment, the representation verification engine 802 may determine that the dependency 816 is verified as being accurate based on determining that a plurality of API requests 818, corresponding to a plurality of combinations of the set of outputs 812 and the set of inputs 814, were successfully processed or fulfilled. The outputs 820 determined as being valid may be stored in the input-output data store 810 for use in validating dependencies of other resources on the PutBar API call 804. Conversely, the representation verification engine 802 may determine that the dependency 816 is inaccurate as a result of determining that one or more of the set of outputs 820 is invalid. As discussed above with respect to FIG. 4, the representation verification engine 802 may use a set of rules specifying user-defined rules for generating inputs to one or more of the inputs according to the schema 806. For instance, the set of rules may be user-defined rules defining inputs to be provided to an API call 804 as a result of detecting one or more conditions in the schema 806 (e.g., inputs to generate in response to detecting "volume" in input schema variable, function, or parameter name).

Moreover, the representation verification engine 802 may perform testing to identify false positives associated with the dependency record 808 and the outputs 820 generated. As a result of determining that an output 820 is a valid output that indicates a confirmation of one of the dependencies in the dependency record 808, the representation verification engine 802 may vary the parameters of the API request 818 to confirm that the confirmation is not a false positive. For instance, the representation verification engine 814 may provide a set of API requests 818 comprising non-conforming input values for the 'this' input 814 and/or the 'foo' output 812 that do not satisfy the associated schema. For instance, the representation verification engine 802 may generate an API request 818 comprising a randomly-generated string value for the 'foo' output 812. If the corresponding output 820 from the PutBar API call 804 is valid, then the representation verification engine 802 may indicate that the corresponding dependency is potentially false. As a result, the representation verification engine 802 may flag the dependency as potentially being invalid, perform further testing to verify the dependency, or notify a system administrator of the potential false positive.

Figure 9:
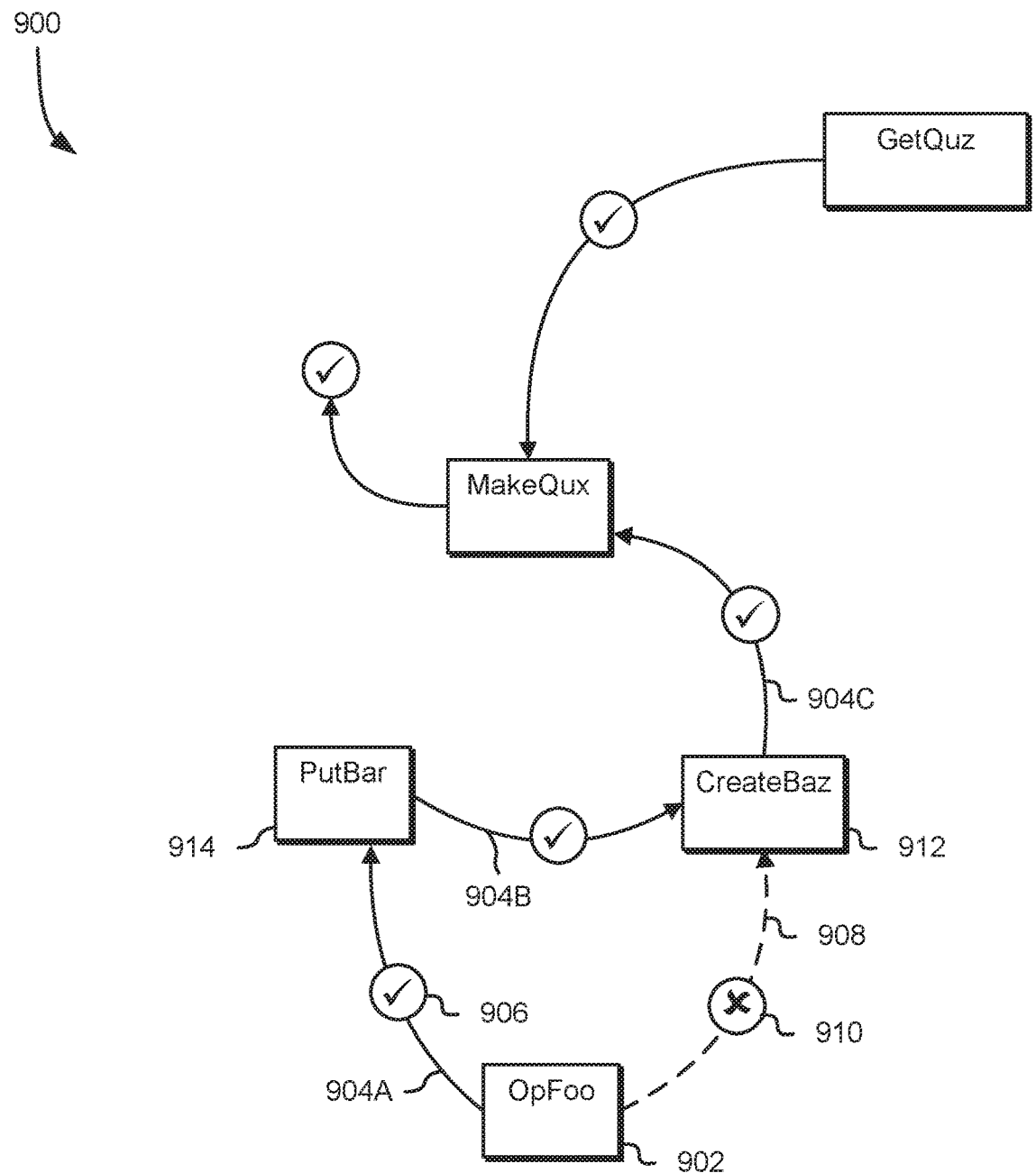
FIG. 9 illustrates an updated representation generated as a result of verifying the representation according to one or more embodiments.

The representation validation engine 802 may evaluate every dependency in the dependency record 808 to verify the accuracy of each dependency. Dependencies verified as being accurate by virtue of producing a valid output may be maintained in the representation whereas dependencies determined to be inaccurate may be removed from the representation. For example, the representation validation engine 802 may update the representation to remove inaccurate dependencies. FIG. 9 shows a representation 900 generated as a result of performing the verification process described above with respect to FIGS. 7 and 8. The representation 900 includes a set of accurate edges 904 corresponding to dependency relationships verified as being accurate based on the production of a valid output 906 from a during the verification process. The representation 900 may also include a set of inaccurate edges 908 corresponding to dependency relationships determined as being inaccurate based on an output of an API call failing to satisfy one or more criteria for validating representation edges. The one or more criteria may relate to whether the output is associated with an indication of successful processing on an input by the API call to produce an output and/or metadata associated with the output. For instance, identification of an invalid output 910 generated during the verification process may be based on content of the output (e.g., whether an expected output was produced), information associated with the output (e.g., HTML codes), and/or based on metadata indicating resource and/or time utilization associated with producing the output. Although the set of inaccurate edges 908 are depicted as being broken-line edges in the representation, the representation verification engine may, in practice, remove the inaccurate edges 908 from the representation 900 and keep the accurate edges 904.

It should be noted that successful verification of some of the dependencies may be a condition precedent to verification of other dependencies. The verification process may therefore include a process of sequential verification of the edges wherein verification of a second dependency is contingent upon previous verification of a first dependency. Using the representation 900 as an example, verification of the dependency 904B of the CreateBaz API call 912 upon the PutBar API call 914 may be dependent upon first verifying the dependency 904A of the PutBar API 914 call upon the OpFoo API call 902, which is an origin node. In particular, the representation verification engine must first verify the dependencies involving the origin nodes before verifying the dependencies of one dependent node upon another. The dependency corresponding to the edge 904A must be verified as an accurate edge prior to attempting to verify the edge 904B to ensure that the inputs used to the PutBar API call 914 are valid. The representation verification engine may obtain a set of valid outputs from the OpFoo API call 902, which are used to verify the dependency of the PutBar API call 914 upon the OpFoo API call 902 by providing the valid outputs as inputs to the dependent resource. Similarly, the edge 904B should be verified as accurate prior to verifying the accuracy of the edge 904C indicating a dependency relationship of the MakeQux API call 916 upon the CreateBaz API call 912.

Figure 10:
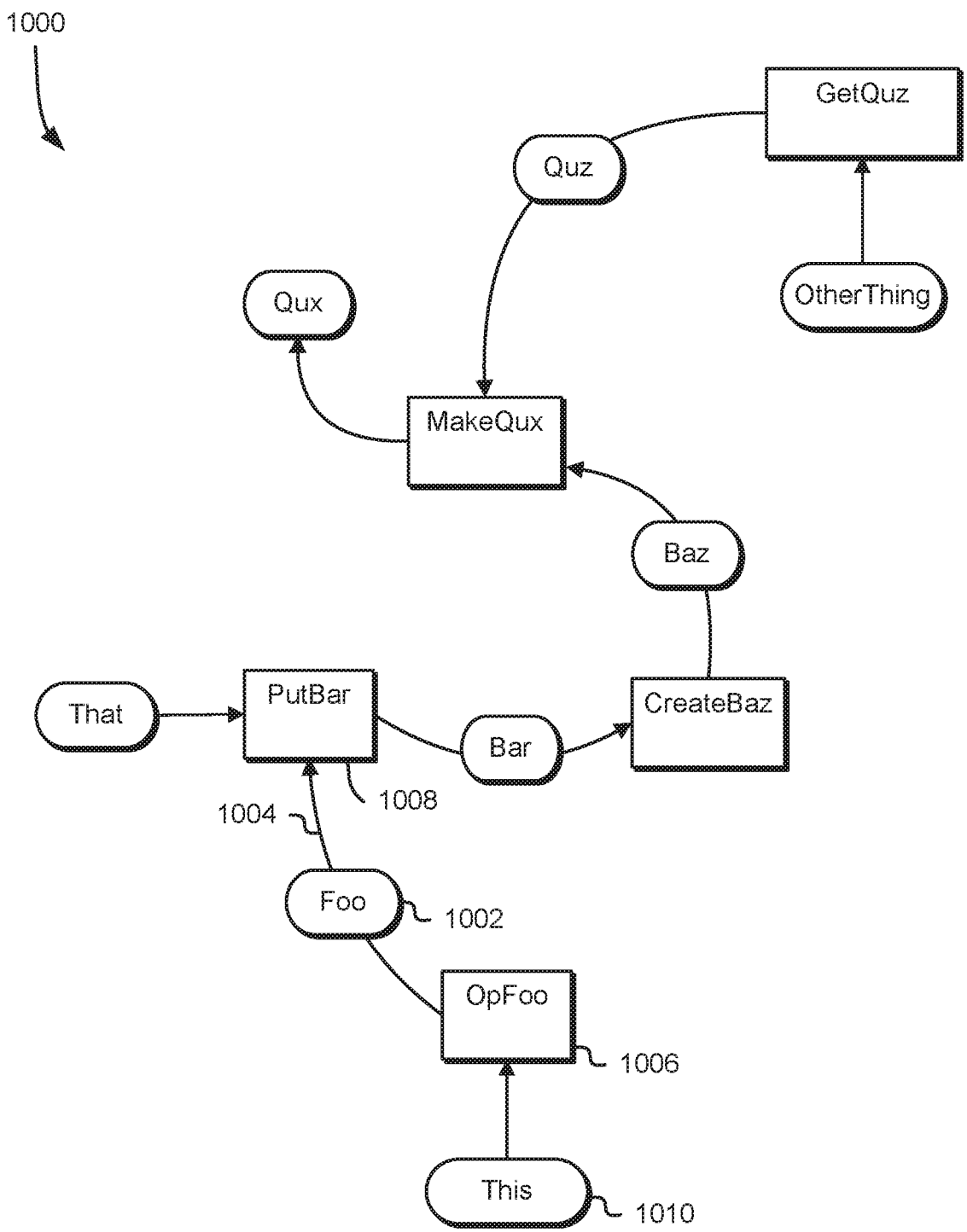
FIG. 10 illustrates a representation of verified dependency relationships of the representation in association with inputs and inputs of the API calls according to one or more embodiments.

It should be further noted that the representation verification engine may store, in data storage, inputs and outputs obtained from the resources during the verification process. These inputs and outputs may be used to test the resources for bugs, such as errors or failures caused by providing an input that should produce a valid output. The software testing service may, in one embodiment, vary certain parameters of the inputs during the testing process. FIG. 10 shows a representation 1000 representing verified dependency relationships between resources of software being tested. After verifying the accurate edges of the initial representation and removing the inaccurate edges, the representation verification engine may provide information corresponding to the representation 1000 to a testing engine of the software testing service.

The representation 1000 may include information identifying an input/output reference associated with each edge. For instance, an input/output element 1002 to 'Foo' may be associated with a verified edge 1004 corresponding to a dependency relationship between the OpFoo API call 1006 and the PutBar API call 1008. The software testing service may store a set of outputs from the OpFoo API call in data storage in association with the element 1002 for use in testing or 'fuzzing' the PutBar API call 1008. This may be performed for one or more of the dependency relationships. Each of the input/output elements may correspond to a particular state achieved according to a corresponding input, as described above. Additionally, the software testing service may store various inputs used for verifying or identifying the resources corresponding to the origin nodes. For instance, the software testing service may store a set of inputs for the element of the 'This' input 1010.

The term 'fuzzing' or 'fuzz testing', as used herein, refers to a process of testing software to discover bugs, security flaws, or instabilities in the software. Fuzzing involves submitting large volumes of inputs to software under test and observing the behavior and/or output of the software in response. The inputs, in whole or in part, may include randomly generated inputs, invalid inputs, unexpected inputs, or inputs known to cause problems in some systems. For example, in the context of this disclosure, the 'fuzzing' input may correspond to inputs that have caused other API calls to crash, behave unexpectedly, or generate output that causes other API calls to become unstable or exhibit unexpected behavior.

Figure 11:
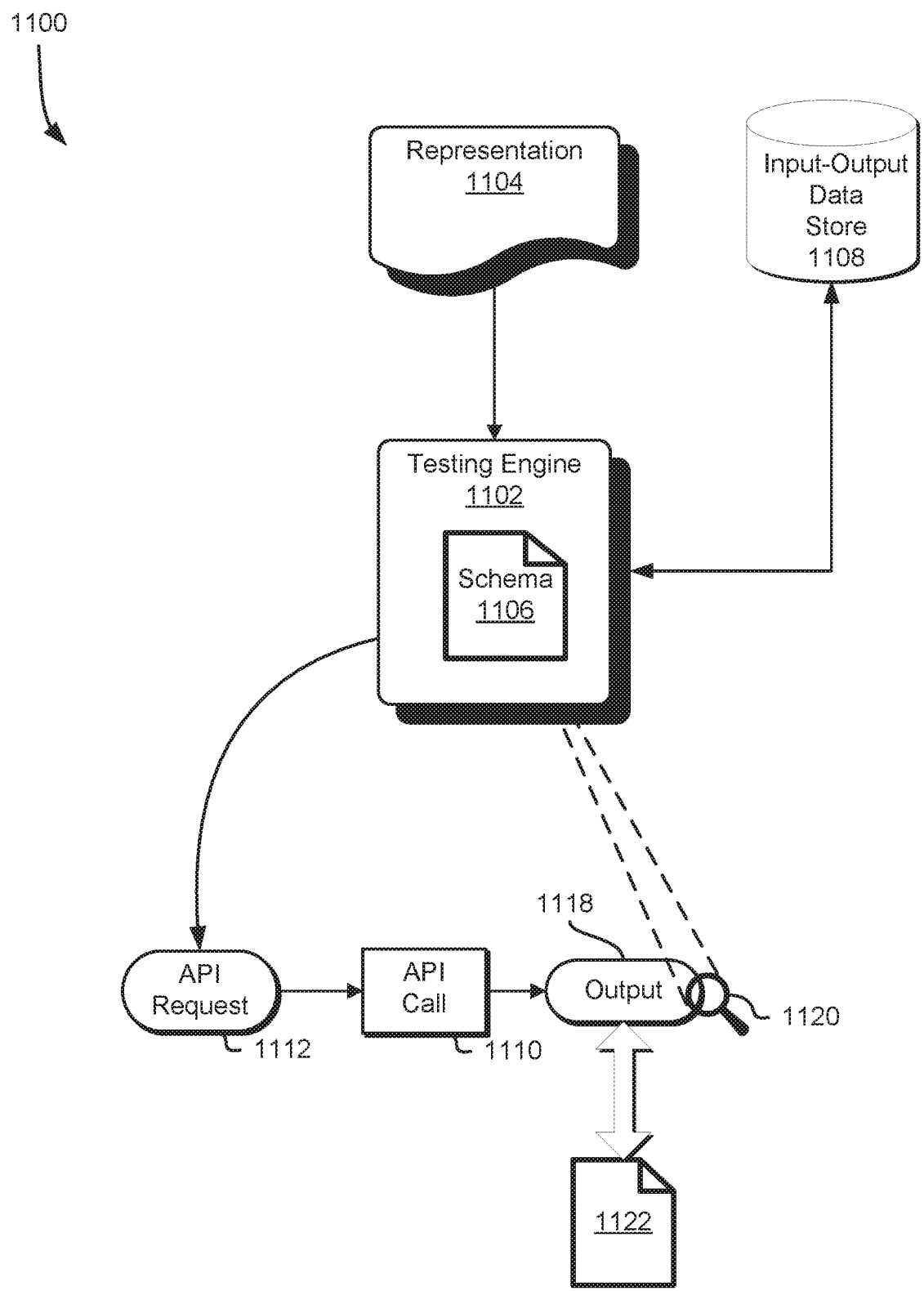
FIG. 11 illustrates an environment in which the API calls of the API are tested using a variety of inputs according to one or more embodiments.

FIG. 11 shows an environment 1100 in which a testing engine 1102 of a software testing service testing a resource of software being tested. Testing, as used herein, refers to the process of providing a number of random inputs to software and monitoring the response to the inputs to identify bugs and instabilities in the software. The testing engine 1102 may obtain, from the representation verification engine, a representation 1104 or equivalent information, such as a chart indicating dependencies and input/output elements. The testing engine 1102 may then test resource in the representation 1104 using schema 1106 for the respective resources. The testing engine 1102 may also obtain outputs from an input/output data store 1108 to use for testing the resources. An example of a schema 1106 may be a data model describing how a web-based set of operations are executed, such as how an API call executes. The data model may include information indicating a format or syntax of a set of arguments of an API call, which arguments are required and which are optional, or what a format or syntax of an output of an API call looks like given a valid input, by way of non-limiting example.

The testing engine 1102 may select a resource in the representation 1104 to test. The testing engine 1102 may start by testing resources corresponding to the origin nodes, then traverse along edges to test resources corresponding to dependent nodes from the origin nodes, then to subsequent dependent nodes until every resource represented in the representation 1104 has been tested. To test a resource, such as an API call 1110, the testing engine may generate one or more requests to the resource, such as an API request 1112. The testing engine 1102 may generate a set of API requests 1112 to test whether the API call 1110 contains any bugs or instabilities. One or more of the set of API requests 1112 may at least in part comply with one or more constraints of the schema 1104. For instance, the testing engine 1102 may vary the parameters or variables associated with the schema 1104 to produce different outputs. In one embodiment, the testing engine 1102 may generate API requests 1112 comprising random inputs to determine an output 1118 produced thereby.

As an example, with reference to the representation 1000 provided to the testing engine 1102, the testing engine 1102 may generate a set of API requests 1112 corresponding to the 'This' input element. Some of the set of API requests 1112 may comply with the input schema for the 'This' input element while others of the set of API requests may not comply with the input schema. The set of API requests 1112 may be provided to the 'OpFoo' API call 1110, and the testing engine 1102 may analyze 1120 the output 1118 produced thereby. The testing service 1120 may record any abnormal results, such as if an error code is associated with the output 1118, such as a '500' HTTP code indicating an internal server error in the API call 1110 caused by the API request 1112. The testing engine 1102 may store one or more of the results 1118 produced into the input/output data store 1108 for use in testing a dependent resource. In one embodiment, the testing engine 1102 may generate the API requests 1112 according to the set of rules defining characteristics of inputs that should be provided to an API call based on conditions detected in its schema 1106, as discussed above with respect to FIG. 4. The testing engine 1102 may generate an API request 1112 having one or more predetermined input values based on a name or pattern detected in the schema 1106. For instance, the testing engine 1102 may generate an API request 1112 including an integer corresponding to a predetermined data storage volume size to input as a size parameter for an API call 1110 having an input including 'volume' in its name or having a 'volume' string in a parameter. As another example, the testing engine 1102 may include one or more predetermined resource names in the API request 1112 in response to determining that the schema 1106 for the API call 1110 includes the string 'resource'. The set of rules provides a set of inputs that enable the testing engine 1102 to establish a default input case for various input characteristics.

The testing engine 1102 may analyze metadata 1122 associated with the set of outputs 1118 in association with testing the API call 1110. The metadata 1122 may be useable to determine various information regarding the output 1120 and processes associated with the API call 1110 in generating the output 1120. The testing engine 1102 may, in an embodiment, use the metadata 1122 to determine an amount of computing resources utilized in producing the set of outputs 1118, the amount of time it took for the API call 1110 to produce the outputs 1118, and/or information associated with the outputs 1118 (e.g., amount of data storage the output 1118 occupies, location in memory of the output 1118), by way of non-limiting example. The testing engine 1102 may determine that a problem is associated with the API call 1110 based on the metadata 1122. For instance, the testing engine 1102 may determine that a bug or instability is associated with the API call 1110 under test processing a particular API request 1112. As one example, the testing engine 1102 may determine that the API call 706 utilized an excessive amount of resources to generate the output 710 or took an excessive amount of time to generate the output 710 using a particular input 704. Such a determination may be made based on comparison of the metadata of the output 710 to an appropriate predetermined threshold value or range of values, or by comparing the metadata of the output 710 to statistical metrics for metadata of a set of other outputs 710 for the API call 706 (e.g., determining whether the metadata is outside of a standard deviation for the set of outputs 710).

As a result of sufficiently testing the 'OpFoo' API call 1110 such as by obtaining an appropriate number of outputs 1118, the testing service 1102 may proceed to test a resource dependent to the 'OpFoo' API call 1110—namely, the PutBar' API call. To test the PutBar' API call, the testing service 1102 may generate random inputs for the 'That' input element that are used in combination with outputs previously obtained from the 'OpFoo' API call corresponding to the 'Foo' input element identified in the schema 1106 for the PutBar' API call. The 'Foo' input elements may, for example, be obtained from the input-output data store 1108. The testing engine 1102 may obtain and analyze 1120 a sufficient number of results 1118 obtained from the PutBar' API call in this manner. The testing engine 1102 may record and/or notify an authorized entity of any instabilities (e.g., system crashes or failures) or bugs associated with the outputs 1118. The testing engine 1102 may proceed in this manner to test successive dependent resources until every resource corresponding to the nodes of the representation 1104 have been tested.

Figure 12:
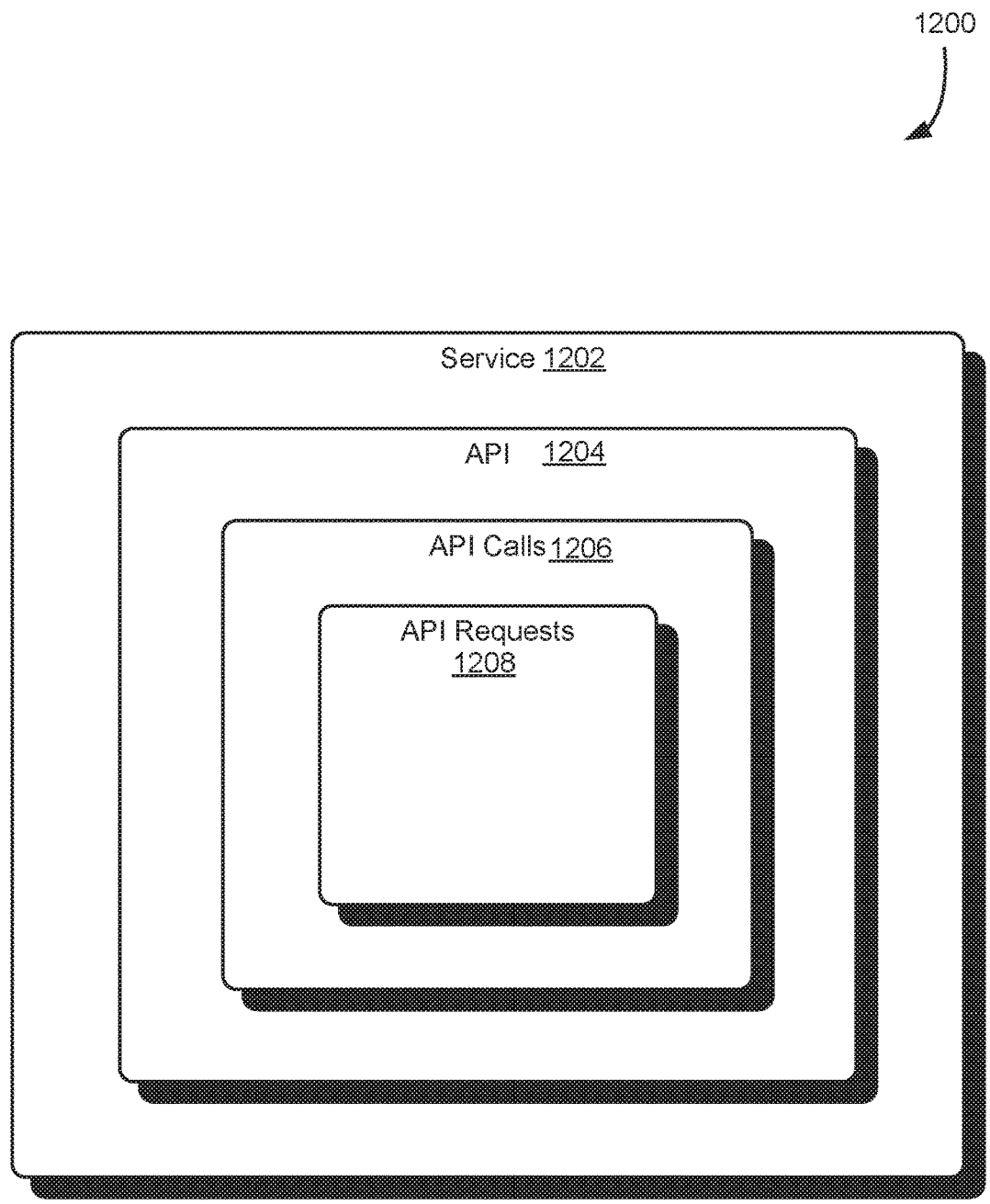
FIG. 12 illustrates a diagram showing relationships between various components related to a service.

As discussed above, various resources of a service or application, such as APIs and API calls may be tested in accordance with one or more embodiments described herein. FIG. 12, accordingly, shows an illustrative example of a diagram 1200 illustrating a way in which various aspects of a service 1202 are related. In this particular example, a series of boxes appear nested within each other wherein each box represents a layer of a computer system. A service 1202 corresponds to a web-based service or application of a computing resource service provider operating in a distributed environment. The computing resource service provider may provide an environment within which one or more applications, processes, services, virtual machines, and/or other such computer system entities may be executed to provide one or more computing resources to customers. The service 1202 may be executable programming code running or executing on one or more computing devices or resources (e.g., servers, personal computers, virtual machines) of or for the service provider. The service 1202 may include executable instructions stored on one or more computer-readable media that cause the service 1202 to perform a set of operations directed to a particular purpose, such as cryptographic operations, data storage operations, compute capacity provisioning services, virtual machine instantiation services, or website-hosting services, by way of non-limiting example. The service 1202 may be accessible via an external API exposed to a user, such as a customer of the service 1202 or another service or application of the service provider.

An API 1204 is a structured set of protocols, definitions, policies, syntaxes, and methods defining ways through which one computer system may communicate with another, separate computer system via a network connection. One example of an API 1204 is a programmatic interface to a defined request-response message system, sometimes expressed in JSON (JavaScript Object Notation) or XML (Extensible Markup Language). The API 1204 may be maintained by the computing resource service provider and may be exposed to other computing system entities based on various conditions, such as a status associated with the API (e.g., private, public) or a statues associated with a computer system (e.g., user, administrator, service provider entity). The API 1204 may be exposed over a network (e.g., internet) to computer systems via an HTTP-based web server of the computing resource service provider.

An API call 1206 corresponds to an invocation that may be made in association with a resource of the API 1204. An API resource is an object with a type, associated data, relationships to other resources, and/or methods to operate on the resource. An API call 1206 corresponds to an operation that can be performed on resources via a resource identifier (e.g., uniform resource identifier, uniform resource locator). The operation may introduce a state change of a resource from a first state to a second state. Such operations may include GET, POST, PATCH, and DELETE methods of a Representational State Transfer Architecture API, for example.

An API request 1208 corresponds to a data interaction, over a network, invoking an instance of the API call 1206. An API request 1208 may properly invoke an API call 1206 as a result of having a syntax conforming to the API 1204, and which references a valid resource identifier of a resource. The API request 1208 may be submitted over a network via an API 1204 exposed to the requesting entity. The API call 1206 may fulfill a valid API request 1208 by causing performance of a state transfer in association with the resource corresponding to the resource identifier, and may also cause generation of a status identifier indicating successful processing of the API request 1208. On the other hand, the API call 1206 may not fulfill the request where the API request 1208 is invalid, which may cause generation of a status identifier indicating unsuccessful processing of the API request 1208.

The various elements of the diagram 1200 may be configured differently than depicted without departing from the scope of the present disclosure. The service 1202 may comprise a plurality of APIs 1204, for example, and each of the APIs 1204 may themselves comprise a plurality of API calls 1206. Each API call 1306 may be configured to receive a plurality of requests 1208 each having a different format or syntax. Note that the terms indicated in the diagram 1200 may be used interchangeably depending on the context.

Figure 13:
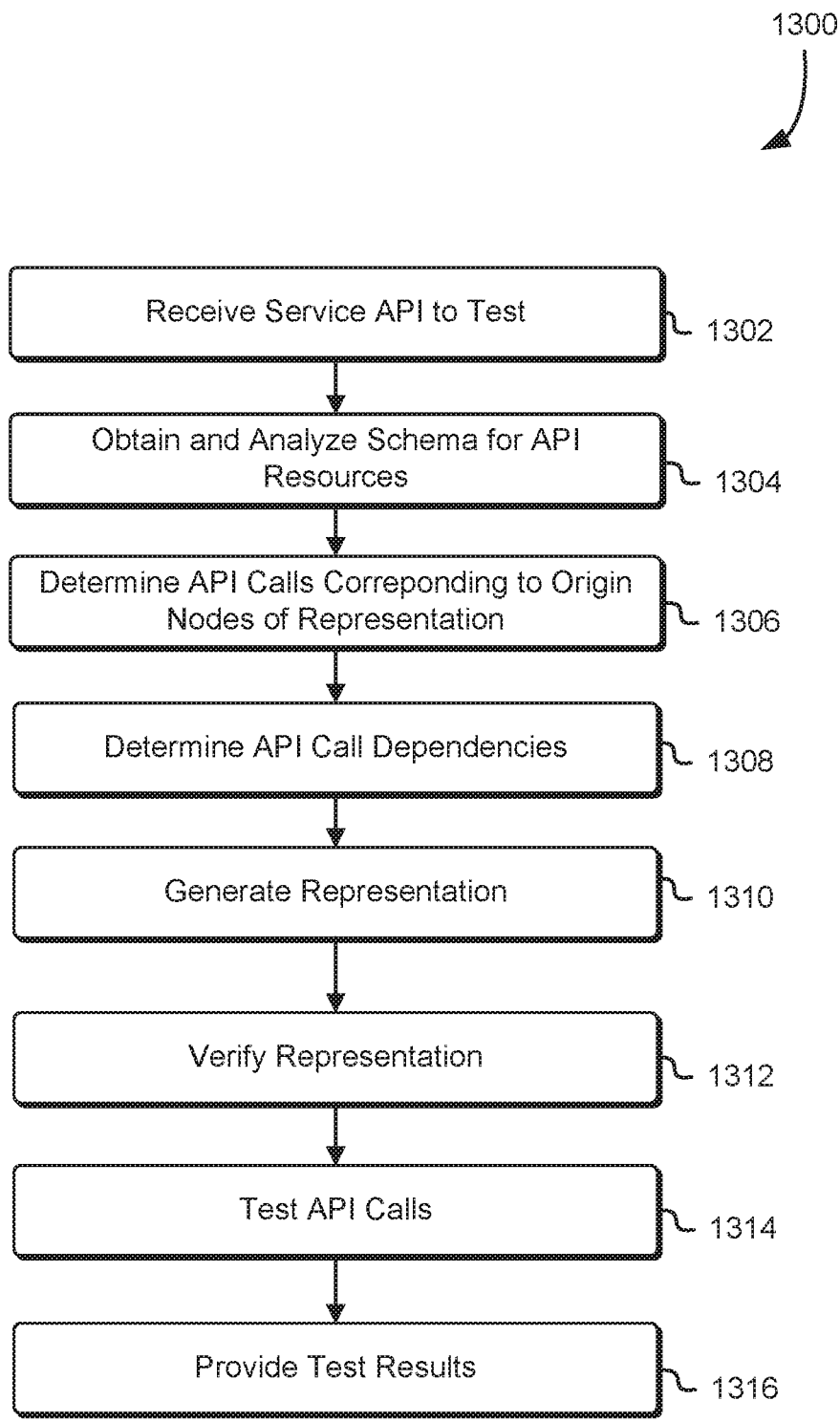
FIG. 13 illustrates a process for generating and verifying the representation, and testing the API according to one or more embodiments.

FIG. 13 illustrates a process 1300 for generating and validating a representation of software to be tested and testing the software using the representation according to one or more embodiments described herein. The process 1300 may be performed by one or more of the entities described herein, such as the testing service of the computing resource service provider. The process 1300 begins by receiving 1302 a web-based API of a service or application to be tested, as described above with respect to FIGS. 1, 2, and 3, for example. The service or application may be received as a part of or in association with a request from an authorized entity, such as a developer, programmer, or system administrator. The service or application may comprise one or more APIs and API calls, as described herein. The testing service may analyze the API to determine the various associated API calls. Next, the testing service may obtain and analyze 1304 schema associated with the API, as described above with respect to FIG. 3, for example. The schema may be included in the API or associated therewith and may describe various characteristics of API calls of the API. The testing service may analyze the schema to determine constraints on the API calls, such as constraints on inputs to and outputs of the API calls.

The testing service may then determine 1306 one or more of the API calls corresponding to origin nodes of a graph representation or equivalent structure to be generated, as described above with respect to FIGS. 3 and 4, for example. As described herein, the API calls corresponding to the origin nodes are API calls that do not have a dependency on another API call. The testing service may then determine 1308 the API dependencies of the API calls based at least in part on the schema obtained, as described above with respect to FIGS. 3 and 5, for example. Determining the API dependencies may include generating a dependency record, as also described herein. Next, the testing service may generate 1310 a representation indicating dependencies between API calls of the API, as described above with respect to FIG. 6. Generating the representation may include generating nodes corresponding to the API calls and edges corresponding to the dependencies between the API calls.

The testing service may then verify 1312 the representation generated to determine its accuracy, as described with respect to FIGS. 7, 8, and 9, for example. Verifying the representation may include updating the representation by at least identifying edges of the representation that are inaccurate, and removing the inaccurate edges from the representation. Thereafter, the testing service may test 1314 the API calls of the API by providing a set of API requests to each of the API calls, as described with respect to FIGS. 10 and 11. The API requests may be generated based on the accurate dependency relationships determined, and by outputs of API calls generated during the verification of the representation. In particular, the outputs of the API calls may correspond to states of the API caused by providing a particular valid input to a dependent API call. Testing the API calls may also include providing a set of API requests having components (e.g., parameters, variables) randomly generated. Finally, the testing service may provide 1316 results of the testing process, such as by notifying an authorized entity of bugs or instabilities detected in the API being tested.

Figure 14:
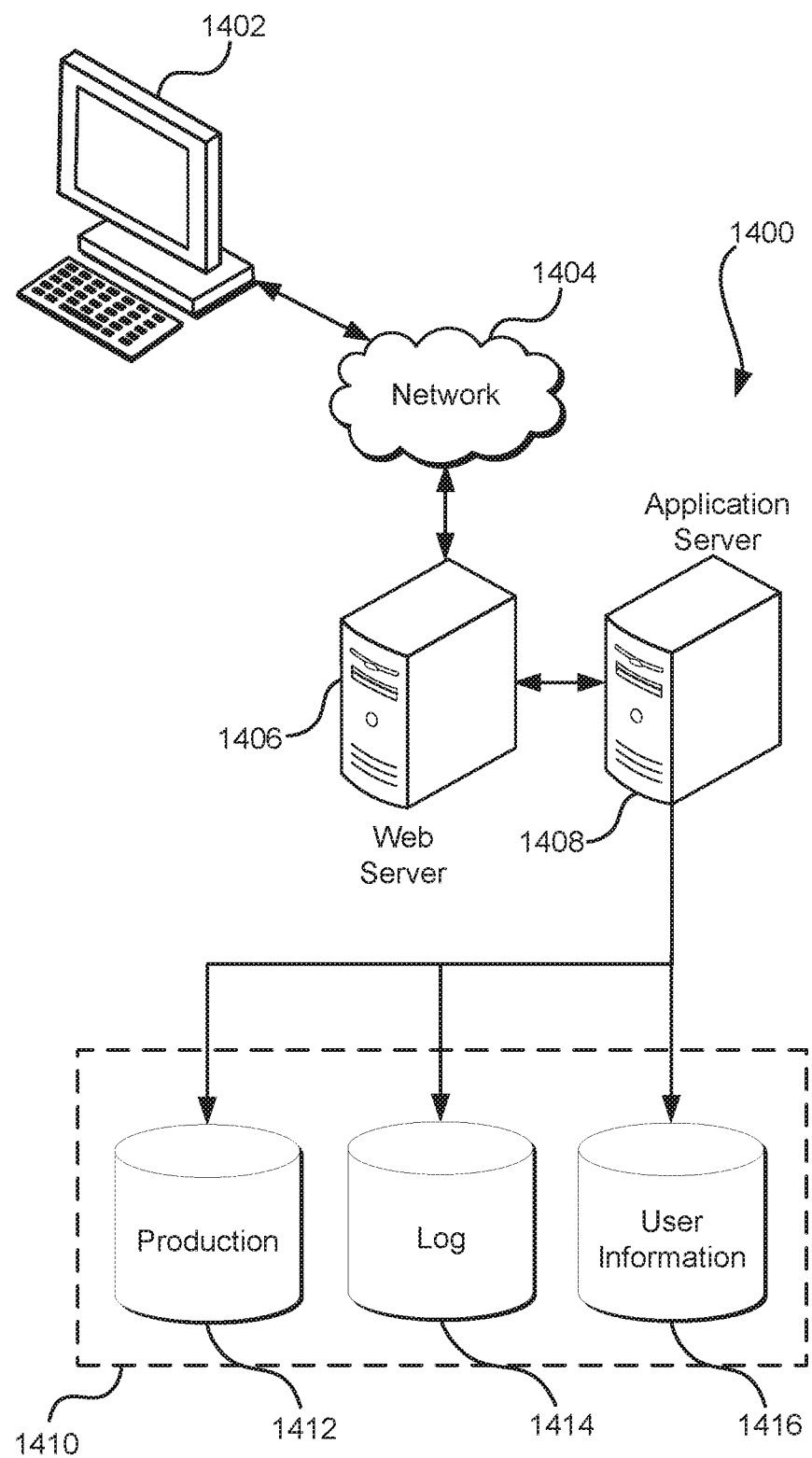
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining information describing a set of web service application programming interface (API) calls;
   using the information to match outputs of the set of web service API calls to inputs of the set of web service API calls to determine a set of matches by at least comparing an output schema of a first web service API call with an input schema of second web service API;
   using the set of matches to generate a graph representation of the set of web service API calls that indicates dependencies between the set of web service API calls, wherein the graph representation includes a set of edges that correspond to dependency relationships between a subset of the set of web service API calls;
   providing a set of API requests to the set of web service API calls to verify the graph representation; and
   using the graph representation to test a web service using a set of inputs generated based at least in part on the set of API requests.

2. The computer-implemented method of claim 1, wherein the graph representation comprises a set of nodes corresponding to the set of web service API calls and the set of edges corresponding to the set of matches.

3. The computer-implemented method of claim 2, wherein a first API request of the set of API requests is generated based at least in part on an output of a web service API call not having a dependency upon another web service API call.

4. The computer-implemented method of claim 3, wherein verifying the graph representation includes removing an edge of the set of edges as a result of a second web service API call generating an output, in response to receiving the first API request, failing to satisfy criteria for identifying valid API output.

5. A system, comprising:
   one or more processors; and
   memory that stores computer-executable instructions that, as a result of execution by the one or more processors, cause the system to:
     match output of a second set of API calls of a plurality of API calls to input of a first set of API calls of the plurality of API calls based at least in part on information characterizing the first set of API calls and second set of API calls to result in a set of matches by at least comparing an output schema of a first API call with an input schema of second API call;
     generate a representation of API call dependencies based at least in part on the set of matches, wherein the representation includes a set of edges, wherein the set of edges correspond to dependency relationships between a subset of the plurality API calls;
     generate a set of API requests based at least in part on the representation; and
     provide the set of API requests to be used by a second system to perform testing on a third system.

6. The system of claim 5, wherein the representation is a graph comprising a set of nodes corresponding to API calls and the set of edges corresponding to the API call dependencies.

7. The system of claim 5, wherein the third system is an API associated with a web service, and the second system comprises a testing service that tests APIs.

8. The system of claim 5, wherein the information defines a set of constraints relating to the input of the first set of API calls and the output of the second set of API calls.

9. The system of claim 8, wherein the set of constraints characterize a parameter name associated with the input of the first set of API calls or the output of the second set of API calls.

10. The system of claim 8, wherein the set of constraints characterize a pattern associated with the input of the first set of API calls or the output of the second set of API calls.

11. The system of claim 8, wherein the set of constraints characterize a structure associated with the input of the first set of API calls or the output of the second set of API calls.

12. The system of claim 5, wherein execution of the computer-executable instructions further cause the system to determine the API call dependencies based on matching an aspect of the input of the first set of API calls with an aspect of the output of the second set of API calls.

13. A non-transitory computer-readable storage medium having stored thereon executable instructions that, as a result of being executed by one or more processors of a computer system, cause the computer system to at least:
    obtain information describing a set of API calls;
    analyze the information to determine a set of matches between inputs of the set of API calls and outputs of the set of API calls by at least comparing an output schema of a first API call with an input schema of second API call;
    generate a representation of API call dependencies based at least in part on the set of matches, wherein the representation includes a set of edges, wherein the set of edges correspond to dependency relationships between a subset of the set of API calls; and
    provide the representation to test a service comprising an API that includes the set of API calls.

14. The non-transitory computer-readable storage medium of claim 13, wherein the representation includes an origin node corresponding to an API call of the set of API calls identified, based at least on the information, as not having a dependency on another API call.

15. The non-transitory computer-readable storage medium of claim 14, wherein an edge of the set edges connects the origin node to another node, the edge corresponding to an API call dependency of a second API call of the set of API calls on the API call, the API call dependency determined based at least in part on the information.

16. The non-transitory computer-readable storage medium of claim 13, wherein the executable instructions, as a result of execution by the one or more processors, further cause the computer system to validate the representation by at least transmitting an API request to a second API call determined as having an API call dependency upon a first API call, the API request generated based at least in part on an output of the first API call.

17. The non-transitory computer-readable storage medium of claim 16, wherein validating the representation further includes updating the representation by at least removing an edge of the representation as a result of determining that an output produced by the second API call in response to the API request fails to satisfy a criteria for identifying valid API output.

18. The non-transitory computer-readable storage medium of claim 16, wherein the first API call is determined as not having a dependency on another node, and validating the representation further includes providing a second API request to a third API call determined as having a second API call dependency on the second API call, the second API request generated based at least in part on an output of the second API call.

19. The non-transitory computer-readable storage medium of claim 13, wherein the representation is provided to test the service as a result of verifying the accuracy of the representation, and testing the service includes transmitting a plurality of API requests generated based at least in part on the information and outputs of one or more of the API calls generated during verification.

20. The non-transitory computer-readable storage medium of claim 13, wherein testing the service includes determining whether metadata associated with a set of outputs generated by the set of API calls satisfies criteria for evaluating API output.

* * * * *